United States Patent [19]

Toriuchi et al.

[11] Patent Number: 5,063,135

[45] Date of Patent: Nov. 5, 1991

[54] COLOR DIFFUSION TRANSFER PHOTOGRAPHIC LIGHT-SENSITIVE MATERIAL

[75] Inventors: Masaharu Toriuchi; Hirokazu Kondo, both of Kanagawa, Japan

[73] Assignee: Fuji Photo Film Co., Ltd., Kanagawa, Japan

[21] Appl. No.: 485,907

[22] Filed: Feb. 27, 1990

[30] Foreign Application Priority Data

Feb. 27, 1989 [JP] Japan .................................... 1-45723
Mar. 3, 1989 [JP] Japan .................................... 1-51571
Mar. 30, 1989 [JP] Japan .................................... 1-80104
Apr. 18, 1989 [JP] Japan .................................... 1-97873

[51] Int. Cl.$^5$ ................. G03C 5/54; G03C 1/42/1/04
[52] U.S. Cl. .................................... 430/214; 430/215; 430/216; 430/217; 430/551; 430/627; 430/628
[58] Field of Search .............................. 430/214–217, 430/551, 627, 628

[56] References Cited

U.S. PATENT DOCUMENTS

| | | | |
|---|---|---|---|
| 2,735,765 | 2/1956 | Loria et al. | 430/551 |
| 4,286,042 | 8/1981 | Sakai et al. | 430/216 |
| 4,542,092 | 9/1985 | Toya et al. | 430/214 |
| 4,584,264 | 4/1986 | Ohki et al. | 430/214 |
| 4,983,506 | 1/1991 | Ono et al. | 430/214 |

FOREIGN PATENT DOCUMENTS 1206337 8/1989 Japan .................................... 430/627
1289822 11/1989 Japan .

Primary Examiner—Richard L. Schilling
Attorney, Agent, or Firm—Sughrue, Mion, Zinn Macpeak & Seas

[57] ABSTRACT

A color diffusion transfer photographic light-sensitive material is disclosed, said light-sensitive material comprising at least one selected from the group consisting of polymers obtained by the condensation of at least one of compounds represented by the general formula (I) and at least one of compounds represented by the general formula (II) in the presence of an acid or alkaline catalyst; polymers obtained by the condensation of at least one of compounds represented by the general formula (I) and at least one of compounds represented by the general formula (III) in the presence of an acid catalyst; novolak resins obtained by the condensation of at least one of compounds represented by the general formula (I) and at least one of compounds represented by the general formula (IV) in the presence of an acid catalyst in a uniform organic solvent system while eliminating off water produced upon azeotropy; and polymers obtained by the condensation of at least one of compounds represented by the general formula (I) and at least one of compounds represented by the general formula (V) in the presence of an acid catalyst:

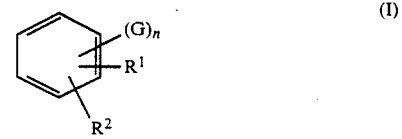

(I)

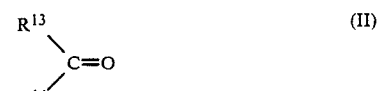

(II)

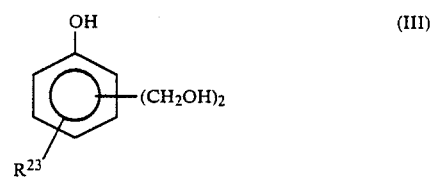

(III)

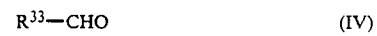

(IV)

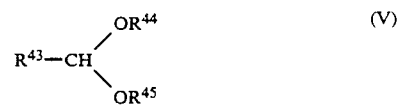

(V)

wherein G represents a hydroxyl group or a group which undergoes hydrolysis by an alkali to produce a hydroxyl group; n represents an integer 1 or more, with the proviso that the plurality of G's may be the same or different; $R^1$, $R^2$, $R^{13}$, $R^{14}$, $R^{23}$, $R^{33}$, $R^{43}$, $R^{44}$ and $R^{45}$ are defined in the specification.

7 Claims, No Drawings

COLOR DIFFUSION TRANSFER PHOTOGRAPHIC LIGHT-SENSITIVE MATERIAL

FIELD OF THE INVENTION

The present invention relates to a color diffusion transfer photographic light-sensitive material. More particularly, the present invention relates to a color diffusion transfer photographic light-sensitive material which expedites image completion and exhibits a high film strength.

BACKGROUND OF THE INVENTION

It has been well known that a color diffusion transfer photographic light-sensitive material comprises an interlayer to prevent an oxidation product of a developing agent formed by development of one light-sensitive layer from diffusing into and staining other color-sensitive light-sensitive layers or dye providing compound-containing layers. It has also been known that the interlayer contains a color stain inhibitor for this purpose.

Typical examples of such a color stain inhibitor are hydroquinone compounds. As such hydroquinone compounds there have been proposed mono-n-alkylhydroquinones in U.S. Pat. Nos. 2,360,290, 2,419,613, 2,403,721, and 3,960,570, monobranched alkylhydroquinones in U.S. Pat. No. 3,700,453, JP-A-49-106329, JP-A-50-156438 (the term "JP-A" as used herein means an "unexamined published Japanese patent application"), and West German Patent OLS No. 2,149,789, dialkyl-substituted hydroquinones in U.S. Pat. Nos. 2,728,659, 2,732,300, 3,243,294, and 3,700,453, British Patent 752,146, JP-A-50-156438, JP-A-53-9528, JP-A-54-29637, and JP-B-50-21249 (the term "JP-B" as used herein means an "examined Japanese patent publication"), arylhydroquinones in U.S. Pat. No. 2,418,613, hydroquinones nucleus-substituted by electrophilic groups such as acyl group, nitro group, cyano group, formyl group and halogenated alkyl group in U.S. Pat. No. 4,198,239, hydroquinones substituted by aliphatic acylamino group, ureido group, urethane group or the like in U.S. Pat. No. 4,198,239, hydroquinones substituted by sulfonamido groups in JP-A-59-202465, and hydroquinones containing electrophilic groups in JP-A-57-22237, such as hydroquinone substituted by carbamoyl groups.

Only color stain inhibitors having a sufficient nondiffusibility are practically significant. For example, dialkylhydroquinone color stain inhibitors each needs to contain a total of 30 or more carbon atoms in its dialkyl portion. Most such hydroquinone compounds are in the form of oil. If such an oil compound is incorporated in the interlayer in a large amount, it softens the film or oozes out and diffuses into other layers. This requires the use of a binder for supporting the film (e.g., gelatin) in a large amount, resulting in an unnecessarily thick film.

On the other hand, it is rather commercially essential that a color diffusion transfer photographic light-sensitive material provides a short time required between the beginning of processing and the completion of images, i.e., fast image formation. In order to expedite the image completion, various approaches have been proposed. In particular, it is the most essential and effective to provide a thinner light-sensitive material, i.e., shorten the diffusion distance over which a dye diffuses into and reaches the image-receiving layer. To this end, it is effective to reduce the binder (e.g., gelatin) content in each layer. However, the reduction of the binder content causes some disadvantages. For example, the film strength is deteriorated. The adhesion of one layer to its adjacent layers is lowered, causing the layer to be peeled off. Furthermore, emulsified materials or emulsions present in layers lower their supporting capability, causing compounds to migrate to adjacent layers during a prolonged period of time.

Among these disadvantages, the deterioration in the film strength and the adhesion of one layer to adjacent layers become remarkable particularly in photographic materials of the process wherein the image-supporting portion is peeled off the film unit after the completion of images. In particular, if the interlayer (color stain inhibitor) can be peeled off its adjacent layer by a power equal to or less than that required to peel the release layer, the image-supporting portion cannot be surely peeled off the release layer but can be peeled off the interlayer. This is a critical defect that disables the view of images in the image-receiving layer.

Among various peel processes, an example wherein the film properties of the interlayer are the most important is described in JP-A-63-226649. In this process, the basic structure comprises a white support, an image-receiving layer, a release layer, a cyan color material layer, a silver halide emulsion layer, an interlayer, a magenta color material layer, a silver halide emulsion layer, an interlayer, a yellow color material layer, a silver halide emulsion layer, and a protective layer coated sequentially on a support. In this structure, images cannot be viewed unless the image-receiving layer can be surely peeled off the release layer. However, if the conventional interlayer is used, the image-receiving layer is often peeled off the interlayer. It has been thus keenly desired to improve the film strength of the interlayer.

The process described in JP-A-59-220727, too, has a big disadvantage in that the image receiving layer is peeled off the interlayer.

In a laminated integrated type light-sensitive material as described in JP-B-46-16356, JP-B-48-33697, JP-A-50-13040, and British Patent 1,330,524 or an ordinary peel apart process, it is keenly required to expedite the image completion. Thus, it has been desired to provide an interlayer capable of giving a thinner layer without deteriorating the film properties (color stain inhibiting layer).

It is also effective to provide an interlayer capable of giving a thinner layer as well as eliminating the need for a partition layer for preventing mixing between the interlayer and the dye providing compound layer. A partition layer as described in JP-B-60-15267 is adapted to improve the raw preservability of light-sensitive materials. Such a partition layer serves to prevent mixing between the interlayer and the dye providing compound layer. Therefore, if an interlayer which can be hardly mixed with the dye providing compound layer is provided, such a partition is no longer needed. Thus, it has been desired to provide an interlayer having excellent raw preservability.

SUMMARY OF THE INVENTION

It is therefore an object of the present invention to provide a color diffusion transfer photographic light-sensitive material which enables prevention of color stain therein, provides a thin film to shorten the image completion time and exhibits a high film strength and high adhesion between adjacent layers to prevent peeling in the vicinity of an interlayer.

The above and other objects of the present invention will become more apparent from the following detailed description and examples.

The above and other objects of the present invention are accomplished with a color diffusion transfer photographic light-sensitive material comprising at least a light-sensitive silver halide emulsion layer combined with a dye providing compound capable of releasing or producing a diffusible dye, an image-receiving layer capable of mordanting the diffusible dye and a neutralizing layer, said light-sensitive material further comprising at least one member selected from the group consisting of polymers obtained by the condensation of at least one of compounds represented by the general formula (I) and at least one of compounds represented by the general formula (II) in the presence of an acid or alkaline catalyst; polymers obtained by the condensation of at least one of compounds represented by the general formula (I) and at least one of compounds represented by the general formula (III) in the presence of an acid catalyst; novolak resins obtained by the condensation of at least one of compounds represented by the general formula (I) and at least one of compounds represented by the general formula (IV) in the presence of an acid catalyst in a uniform organic solvent system while eliminating off water produced upon azeotropy; and polymers obtained by the condensation of at least one of compounds represented by the general formula (I) and at least one of compounds represented by the general formula (V) in the presence of an acid catalyst:

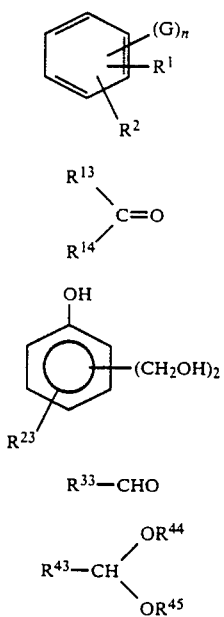

wherein G represents a hydroxyl group or a group which undergoes hydrolysis by an alkali to produce a hydroxyl group; n represents an integer 1 or more, with the proviso that the plurality of G's may be the same or different; $R^1$ and $R^2$ may be the same or different and each represents a hydrogen atom or a substituent on benzene ring; $R^{13}$ and $R^{14}$ may be the same or different and each represents a hydrogen atom, alkyl group, aryl group, aralkyl group, heterocyclic group, acyl group, carboxyl group or formyl group; $R^{23}$ represents a hydrogen atom, alkyl group, aryl group, aralkyl group, heterocyclic group, acyl group, carboxyl group or formyl group; $R^{33}$ represents a hydrogen atom, alkyl group, aryl group, aralkyl group, acyl group, alkenyl group, heterocyclic group, carboxyl group or formyl group; $R^{43}$ represents a hydrogen atom, alkyl group, aryl group, aralkyl group, heterocyclic group, acyl group or carboxyl group; and $R^{44}$ and $R^{45}$ may be the same or different and each represents an alkyl group, with the proviso that $R^{44}$ and $R^{45}$ may be connected to each other to form a ring.

DETAILED DESCRIPTION OF THE INVENTION

The present polymer will be hereinafter referred to as "polymer-based color stain inhibitor".

The present invention will be further illustrated with reference to the general formulae (I) to (V).

$R^1$ and $R^2$ each represents a hydrogen atom or a substitutable group. Examples of such a substitutable group include a halogen atom, cyano group, sulfo group, carboxyl group, and substituted or unsubstituted alkyl group, aryl group, aralkyl group, acyloxy group, acylamino group, amino group, sulfonamido group, alkoxy group, aryloxy group, alkylthio group, carbamoyl group, sulfamoyl group, alkoxycarbonyl group, aryloxycarbonyl group, alkylsulfonyl group, araylsulfonyl group, alkoxysulfonyl group, aryloxysulfonyl group, carboamoylamino group, sulfamoylamino group, carbamoyloxy group, alkoxycarbonylamino group or aryloxycarbonylamino group. When $R^1$ and $R^2$ are positioned adjacent to each other, they can be fused to form a carbon ring or a hetero ring.

$R^{13}$, $R^{14}$, $R^{23}$ and $R^{43}$ each represents a hydrogen atom, straight-chain, branched or cyclic alkyl group (including substituted alkyl group), aryl group such as phenyl group (substituted phenyl group), aralkyl group such as benzyl group and phenethyl group, oxygen-containing ring, nitrogen-containing ring, sulfur-containing ring, oxygen and nitrogen-containing ring, sulfur and nitrogen-containing hetero ring, acyl group such as acetyl group and benzoyl group, carboxyl group, and formyl group.

$R^{33}$ represents a hydrogen atom, alkyl group (including substituted alkyl group), aryl group (including substituted aryl group), aralkyl group (including substituted aralkyl group), acyl group, alkenyl group (including substituted alkenyl group), hetero ring (including substituted hetero ring), carboxyl group, or formyl group.

$R^{44}$ and $R^{45}$ each represents a straight-chain, branched or cyclic alkyl group (including substituted alkyl group). $R^{44}$ and $R^{45}$ may also be condensed with each other via alkyl group, aryl group, ether group, thioether group or the like to form a carbon ring.

Examples of substituents which can substitute for $R^1$, $R^2$, $R^{13}$, $R^{23}$, $R^{33}$, $R^{43}$, $R^{44}$ and $R^{45}$ include a halogen atom, nitro group, alkoxy group (including substituted alkoxy group), group represented by —NHCOR$^6$ (in which $R^6$ represents an alkyl group (including substituted alkyl group), phenyl group (including substituted phenyl group) or aralkyl group (including substituted aralkyl group)), group represented by —NHSO$_2$R$^6$ (in which $R^6$ is as defined above, group represented by —SOR$^6$ (in which $R^6$ is as defined above), group represented by —SO$_2$R$^6$ (in which $R^6$ is as defined above), group represented by —COR$^6$ (in which $R^6$ is as defined above), group represented by

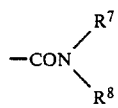

(in which
R⁷ and R⁸ may be the same or different and each represents a hydrogen atom, alkyl group (including substituted alkyl group), phenyl group (including substituted phenyl group) or aralkylgroup (including
substituted aralkyl group)), group represented by

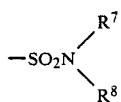

(in which R⁷ and R⁸ are as defined above), amino group (which may be substituted by alkyl group), hydroxyl group, and group which undergoes hydrolysis to form a hydroxyl group.

Examples of substituents to be contained in substituted alkyl group, substituted alkoxy group, substituted phenyl group and substituted aralkyl group among the substituents which can substitute for $R^1$, $R^2$, $R^{13}$, $R^{14}$, $R^{23}$, $R^{33}$, $R^{43}$, $R^{44}$ and $R^{45}$ include a hydroxyl group, nitro group, alkoxy group containing 1 to about 4 carbon atoms, group represented by —NHSO₂R⁶ (in which R⁶ is as defined above), group represented by

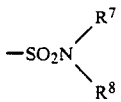

(in which R⁷ and R⁸ are as
defined above, group represented by

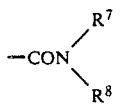

(in which
R⁷ and R⁸ are as defined above), group represented by
—SO₂R⁶ (in which R⁶ is as defined above), group represented by —COR⁶ (in which R⁶ is as defined above), halogen atom, cyano group, and amino group (which may be substituted by alkyl group).

G represents a hydroxyl group or a group which undergoes hydrolysis or like reaction to produce a hydroxyl group. Examples of substituents which can substitute for the hydroxyl group which undergo hydrolysis to form a hydroxyl group include an acyl group (e.g., acetyl group, benzoyl group), oxycarbonyl group (e.g., ethoxycarbonyl group, benzyloxycarbonyl group, tert-butyloxycarbonyl group, phenoxycarbonyl group), carbamoyl group (e.g., N,N-dimethylcarbamoyl group, N,N-diethylcarbamoyl group), sulfonyl group (e.g., methanesulfonyl group, benzenesulfonyl group), 3-ketobutyl group, substituted aminomethyl group (e.g., N,N-dimethylaminomethyl group, 1,5-diketopyrrolidinomethyl group), and phthalide group.

In the general formula (I), R¹ and R² may preferably be the same or different and each represents a hydrogen atom, sulfo group, carboxyl group, hydroxyl group, $C_{1-18}$ substituted or unsubstituted alkyl group, $C_{1-18}$ substituted or unsubstituted alkoxy group, amino group which is unsubstituted or substituted by $C_{1-18}$ alkyl group or $C_{6-24}$ phenyl group (the amino group may be condensed by alone or via alkyl group or hetero atom), $C_{6-24}$ substituted or unsubstituted phenyl group, carbamoyl or sulfamoyl group which is unsubstituted or substituted by $C_{1-18}$ alkyl group or $C_{6-24}$ phenyl group (the Carbamoyl or sulfamoyl group may be condensed by alone or via hetero atom), $C_{1-18}$ substituted or unsubstituted alkylsulfonamido or acylamino group, $C_{6-24}$ substituted or unsubstituted phenylsulfonamido or acylamino group, $C_{1-18}$ substituted or unsubstituted alkylsulfonyl group, $C_{6-24}$ substituted or unsubstituted phenylsulfonyl group, $C_{1-18}$ substituted or unsubstituted alkoxycarbonyl group, or $C_{1-18}$ substituted or unsubstituted alkylcarbonylamino group. G preferably represents a hydroxyl group. The suffix n preferably represents an integer 2 or 3.

$R^{13}$, $R^{14}$, $R^{23}$ and $R^{43}$ each preferably represents a hydrogen atom, $C_{1-18}$ substituted or unsubstituted alkyl group, $C_{7-25}$ substituted or unsubstituted aralkyl group, $C_{6-24}$ substituted or unsubstituted phenyl group, substituted or unsubstituted pyridine ring, or substituted or unsubstituted furan ring.

$R^{33}$ preferably represents a hydrogen atom, $C_{1-18}$ substituted or unsubstituted alkyl group, substituted or unsubstituted phenyl group, or $C_{2-18}$ substituted or unsubstituted alkenyl group (including allyl group).

$R^{44}$ and $R^5$ each preferably represents an alkyl group (including those containing substituents, preferably $C_{1-4}$ alkyl group, e.g., methyl, ethyl, isopropyl, butyl).

Preferred among compounds represented by the general formula (I) are those represented by the general formulae (VI), (VII), (VIII) and (IX). Particularly preferred among these compounds are those represented by the general formulae (VIII) and (IX).

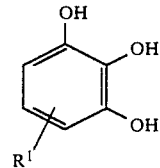

(VI)

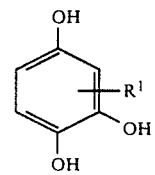

(VII)

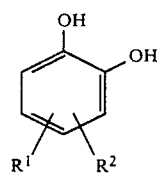

(VIII)

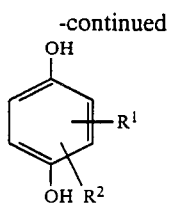
(IX)
wherein R¹ and R² are as defined above.
Specific examples of the compounds represented by the general formulae (I) and (II) will be set forth below, but the present invention should not be construed as being limited thereto.
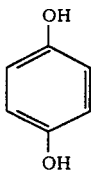
I-1
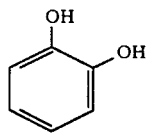
I-2
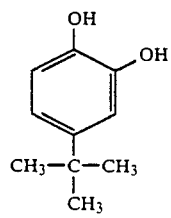
I-3
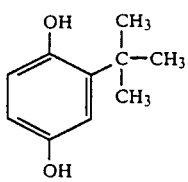
I-4
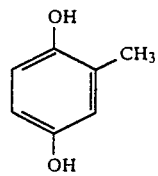
I-5
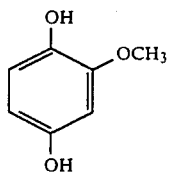
I-6
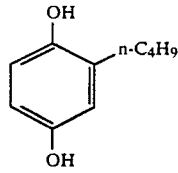
I-7
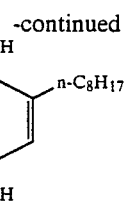
I-8
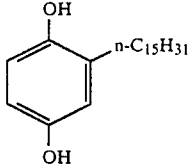
I-9
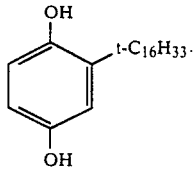
I-10
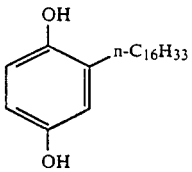
I-11
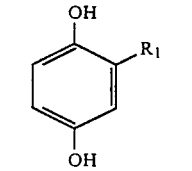
I-12
wherein $R_1$ represents a $C_{10-18}$ mixed alkyl group.
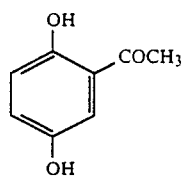
I-13
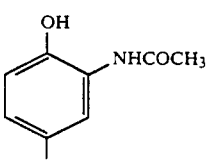
I-14
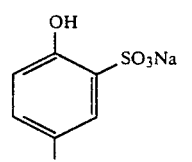
I-15
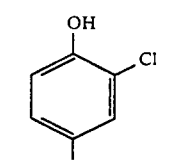
I-16

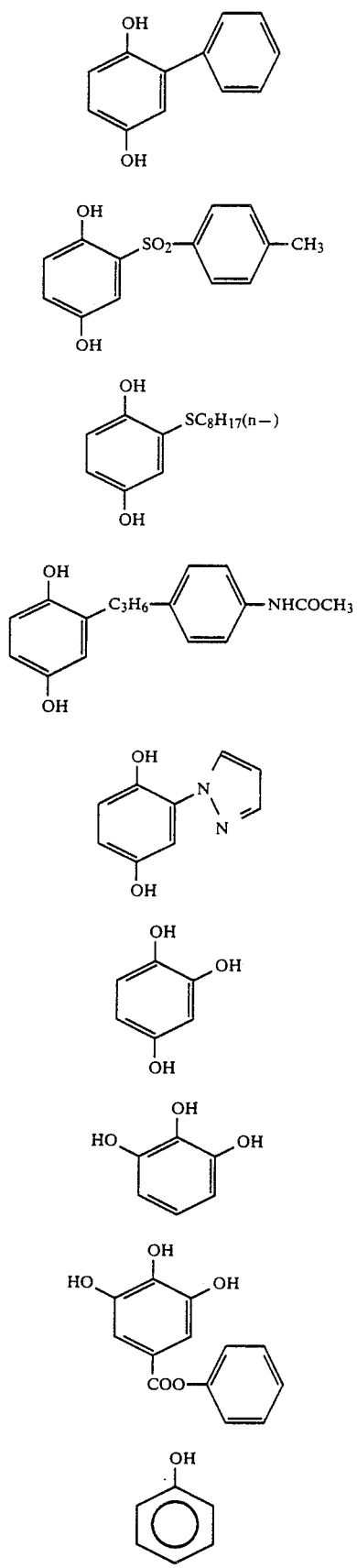
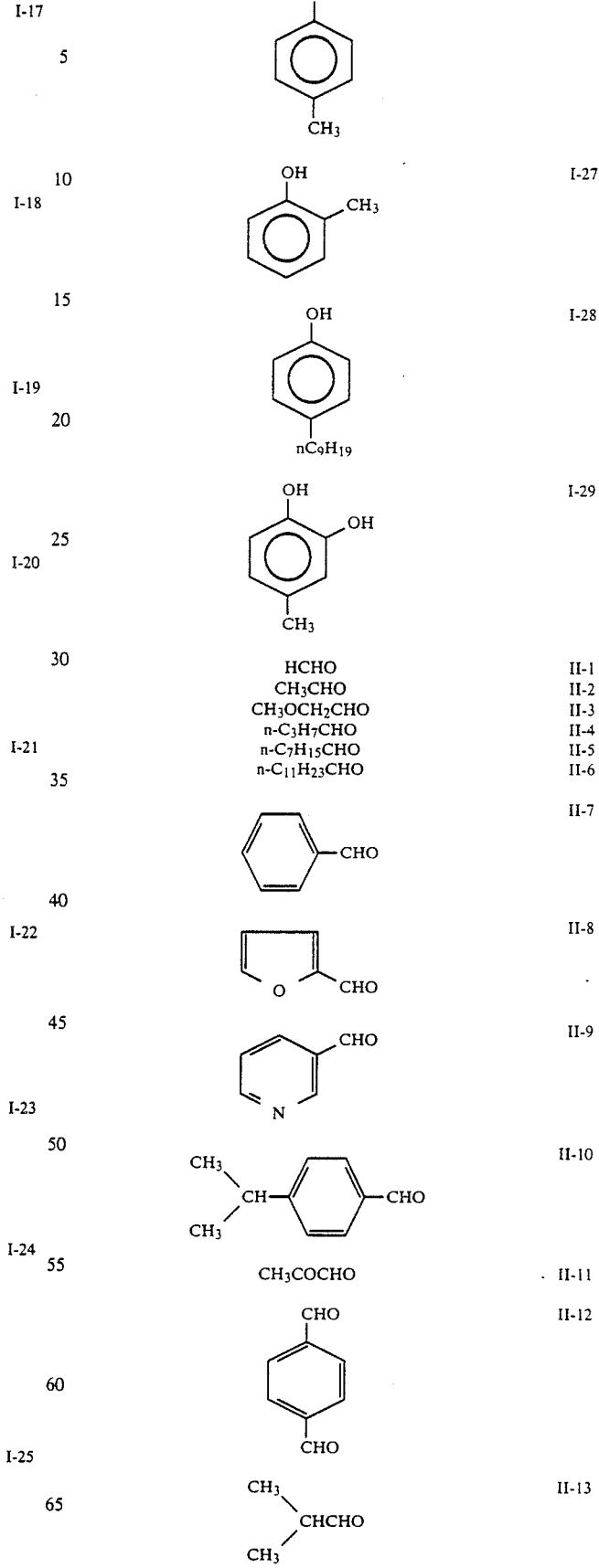

-continued

II-14: 3-hexadecyloxybenzaldehyde (OC₁₆H₃₃ phenyl with CHO)

II-15: OHC—C—OH with =O (glyoxylic acid)
         ‖
         O

II-16: 4-(dimethylamino)benzaldehyde — (CH₃)₂N-C₆H₄-CHO

II-17: OCH—CHO
II-18: Paraformaldehyde

II-19: $CH_3COCH_3$

II-20: $CH_3COCH_2CH_3$

II-21: $CH_3COCH(CH_3)_2$

II-22: $CH_3COCH_2C_6H_5$

II-23: $CH_3COC_6H_{13}(W)$

II-24: $C_2H_5COC_2H_5$

II-25: dicyclohexyl ketone (C₆H₁₁-CO-C₆H₁₁)

II-26: $C_3H_6COC_3H_6$

II-27: $CH_3COCH_2CH_2OH$

II-28: $CH_3COCH_2CH_2N(CH_2CH_3)_2$

II-29: $(CH_3)_2CHCOCH(CH_3)_2$

II-30: $ClCH_2COCH_2Cl$

II-31: $CH_3-CO-CH_2$—(2,5-dihydrofuran)

Preferred among the compounds represented by the general formula (III) are those represented by the general formulae (X) and (XI):

(X) 2,6-bis(hydroxymethyl)phenol with $R^{53}$ at para position (XI) 2-hydroxymethyl-4-$R^{53}$-6-hydroxymethyl... phenol with CH₂OH groups at 2,3 positions and $R^{53}$ at 5

In the general formula (III), $R^{53}$ preferably represents a hydrogen atom, sulfo group, carboxyl group, hydroxyl group, $C_{1-18}$ substituted or unsubstituted alkyl group, $C_{1-18}$ substituted or unsubstituted alkoxy group, amino group which is unsubstituted or substituted by $C_{1-18}$ alkyl group or $C_{6-12}$ phenyl group (the amino group may be Condensed by alone or via alkyl group or hetero atom), $C_{6-12}$ substituted or unsubstituted phenyl group, carbamoyl or sulfamoyl group which is unsubstituted or substituted by $C_{1-18}$ alkyl group or $C_{6-12}$ phenyl group (the carbamoyl or sulfamoyl group may be condensed by alone or via alkyl group or hetero atom), $C_{1-18}$ substituted or unsubstituted alkylsulfonamido or acylamino group, $C_{6-12}$ substituted or unsubstituted phenylsulfonamido or acylamino group, $C_{1-18}$ substituted or unsubstituted alkylsulfonyl group, $C_{6-12}$ substituted or unsubstituted phenylsulfonyl group, $C_{1-18}$ substituted or unsubstituted alkoxycarbonyl group, or $C_{1-18}$ substituted or unsubstituted alkylcarbonyl group.

Specific examples of the compounds represented by the general formula (III) will be set forth below, but the present invention should not be construed as being limited thereto.

III-1: 2,6-bis(hydroxymethyl)-4-methylphenol

III-2: 2,6-bis(hydroxymethyl)-4-tert-butyl... (4-(1,1-dimethylethyl)phenol with CH₃-C(CH₃)₂-CH₃ group; actually C(CH₃)₃)

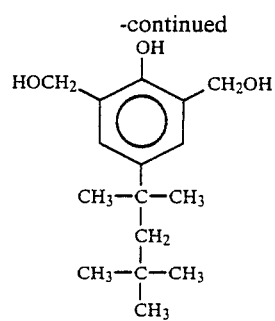
III-3
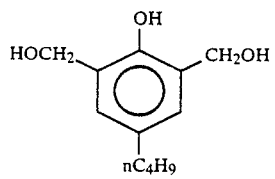
III-4
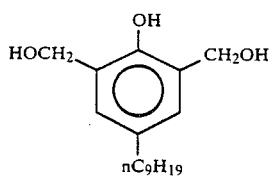
III-5
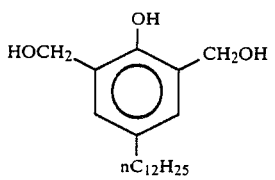
III-6
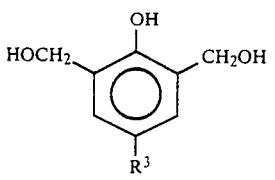
III-7
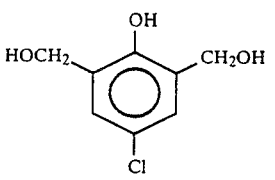
III-8
wherein R³ represents a C₁₀₋₁₈ mixed alkyl group.
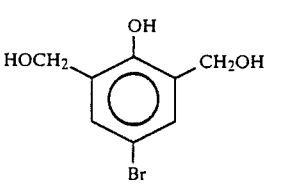
III-9
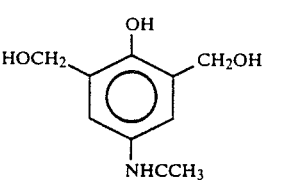
III-10
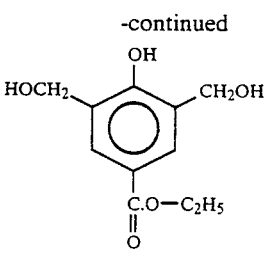
III-11
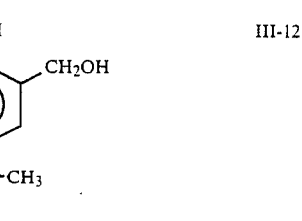
III-12
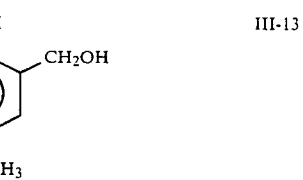
III-13
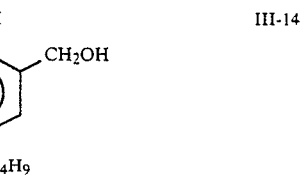
III-14
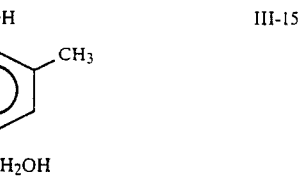
III-15
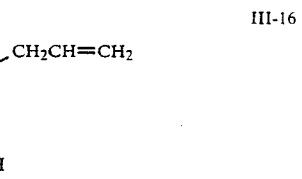
III-16
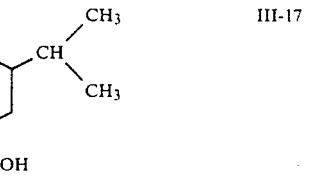
III-17
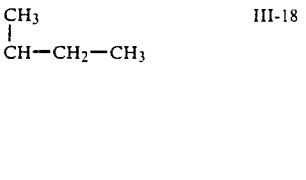
III-18

-continued

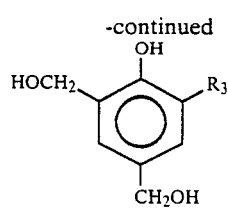
III-19

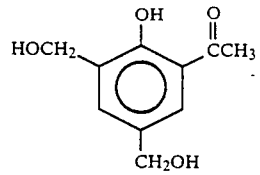
III-20 wherein R₃ represents a C₁₀₋₁₈ mixed alkyl group.

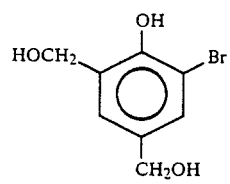
III-21

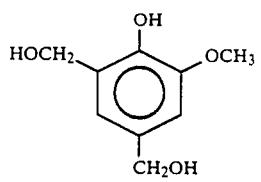
III-22

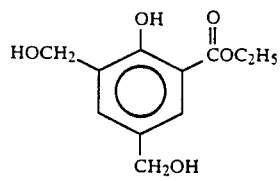
III-23

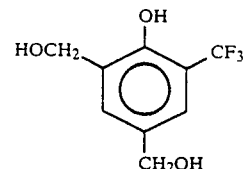
III-24

-continued

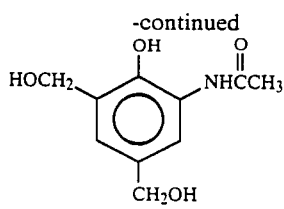
III-25

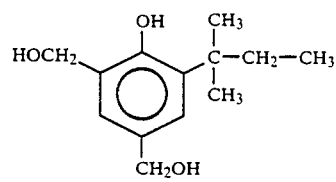
III-26

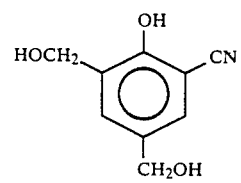
III-27

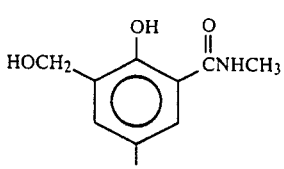
III-28

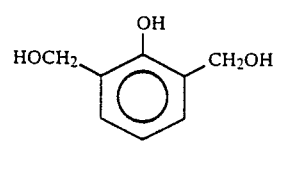
III-29

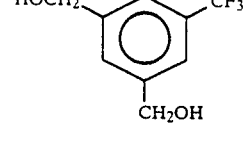
III-30

Specific examples of the compounds represented by the general formulae (IV) will be set forth below, but the present invention should not be construed as being limited thereto.

| | | | |
|---|---|---|---|
| IV-1 | CH₃CHO | IV-2 | CH₃CH₂CHO |
| IV-3 | n-C₃H₇CHO | IV-4 | n-C₄H₉CHO |
| IV-5 | n-C₅H₁₁CHO | IV-6 | n-C₇H₁₅CHO |
| IV-7 | n-C₉H₁₉CHO | IV-8 | n-C₁₁H₂₃CHO |
| IV-9 | CH₃OCH₂CHO | IV-10 | ClCH₂CHO |
| IV-11 | BrCH₂CHO | IV-12 | CNCH₂CHO |
| IV-13 | CH₃COCHO | IV-14 | $\underset{\text{HOCCHO}}{\overset{\text{O}}{\|}}$ |
| IV-15 | $\underset{CH_3}{\overset{CH_3}{\diagdown}}$CHCHO | IV-16 | CH₃(CH₂)₃CHCHO<br>　　　　　　\|<br>　　　　　　C₂H₅ |
| IV-17 | 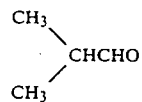 | IV-18 | 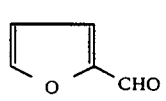 |

-continued
IV-19 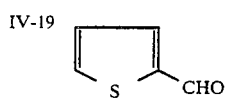   IV-20 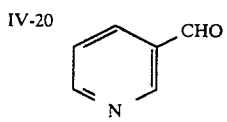
IV-21 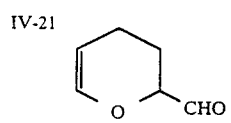   IV-22 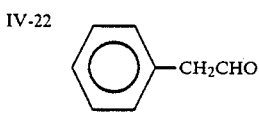
IV-23 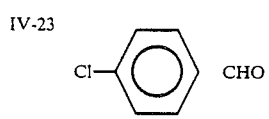   IV-24 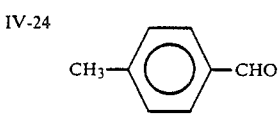
IV-25 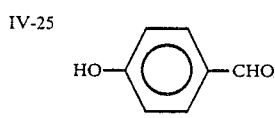   IV-26 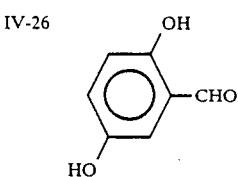
IV-27 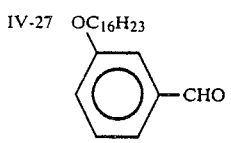   IV-28 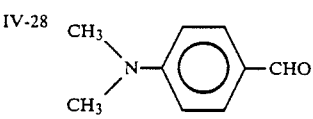
IV-29 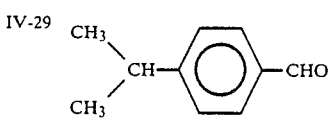   IV-30 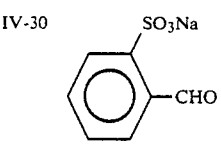
IV-31 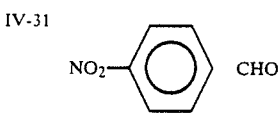   IV-32 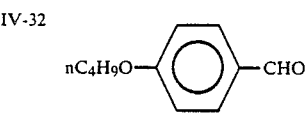
IV-33 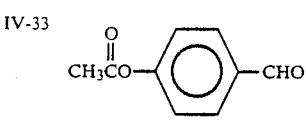   IV-34 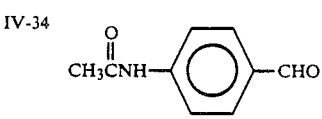
IV-35 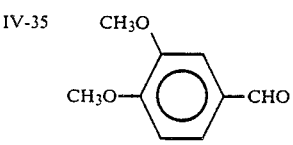   IV-36 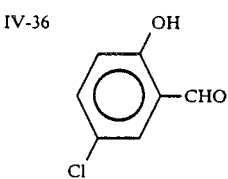
IV-37 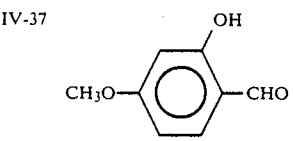   IV-38 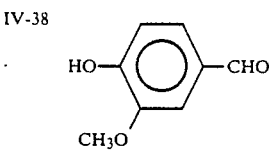
IV-39 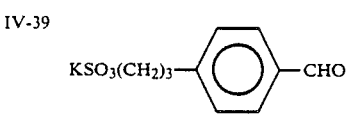   IV-40 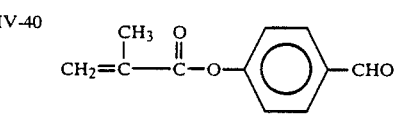

| | | | |
|---|---|---|---|
| IV-41 | 3,4,5-trimethoxybenzaldehyde (CH₃O groups on benzene ring with CHO) | IV-42 | C₆H₅–NHCONHCH₂CHO |
| IV-43 | HOOC–C(Cl)=C(Cl)–CHO | IV-44 | (CH₃)₃C–COCH₂CONHCH₂CHO |
| IV-45 | 1,4-bis(isopropyl/1-methyl-formyl)cyclohexane structure | IV-46 | CH₃CH=CHCHO |
| IV-47 | C₆H₅–CH=CH–C₆H₄–CHO | IV-48 | C₆H₅–CH=CHCHO |
| IV-49 | 2-methoxy-C₆H₄–CH=CH–CHO | IV-50 | HCHO |
| IV-51 | C₆H₅–CHO | IV-52 | CN–C₆H₄–CHO |

Specific examples of the compounds represented by the general formulae (V) will be set forth below, but the present invention should not be construed as being limited thereto.

V-1: 1,3,5-trioxane (cyclic (CH₂O)₃)

V-2: CH₃CH(OC₂H₅)₂

V-3: n-C₃H₇CH(OCH₃)₂

V-4: nC₇H₁₅CH(OCH₃)₂

V-5: n-C₁₁H₂₃CH(OCH₃)₂

V-6: C₆H₅–CH(OCH₃)₂

V-7: 4-nC₄H₉–C₆H₄–CH(OCH₃)₂

V-8: 3-pyridyl–CH(OCH₃)₂

V-9: 2-thienyl–CH(OCH₃)₂

V-10: 2-furyl–CH(OCH₃)₂

-continued

V-11: CH₂=CHCH₂CH₂CH(OCH₃)₂

V-12: CH₂=CH−CH(OCH₃)₂

V-13: C₆H₅−CH₂−CH=CH−CH(OCH₃)₂ (phenyl-CH₂-CH=CH-CH(OCH₃)₂)

V-14: 4-(N(CH₃)₂)-C₆H₄-CH(OCH₃)₂

V-15: 3-(OC₁₆H₃₃)-C₆H₄-CH(OCH₃)₂

V-16: 4-((CH₃)₂CH)-C₆H₄-CH(OCH₃)₂

V-17: 4-CH₃-C₆H₄-CH(OCH₃)₂

V-18: 4-CN-C₆H₄-CH(OCH₃)₂

V-19: 4-Cl-C₆H₄-CH(OCH₃)₂

-continued

V-20: 4-CF₃-C₆H₄-CH(OCH₃)₂

V-21: cyclohexyl-CH(OCH₃)₂

V-22: 2-(1,3-dioxolan-2-yl)phenyl (benzene with −CH(O−CH₂−O−CH₂−) fused ring)

V-23: (CH₃)₂CH−CH(OC₂H₅)₂

V-24: CH₃CH₂CH(OC₂H₅)₂

V-25: CH₃−CH₂CH(O-iso-C₄H₉)₂

V-26: CH₃CH₂CH(OCH₃)(O-iso-C₄H₉)

V-27: CH₃O−C₆H₄−CO−CH₂CONH−C₆H₄−CH₂CH(OC₂H₅)₂

V-28: (CH₃)₃C−CO−CH₂CONH−C₆H₄−CH₂CH(OC₂H₅)₂

V-29: CH₂=CHCONH−C₆H₄−CH(OCH₃)₂

V-30: CH₂=C(CH₃)CONH−C₆H₄−CH(OCH₃)₂

V-31: C₆H₅−NHC(=S)NHCH₂CH(OC₂H₅)₂

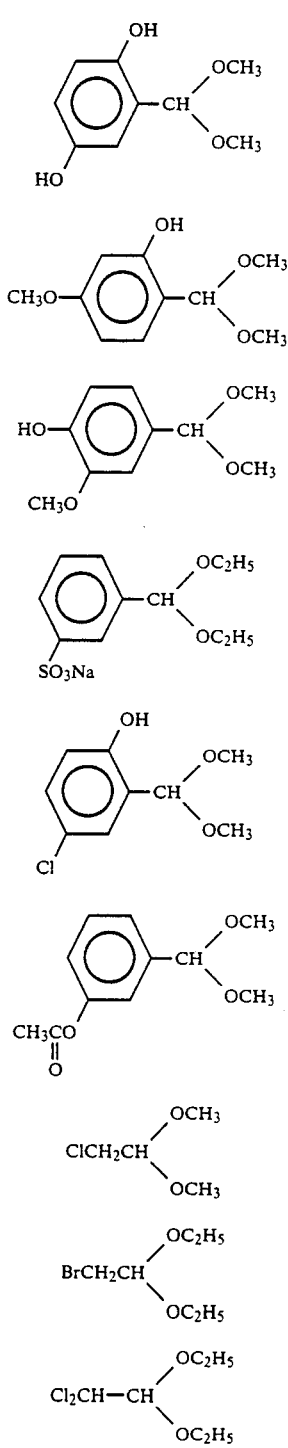

V-32

V-33

V-34

V-35

V-36

V-37

V-38

V-39

V-40

The preparation method for the above-mentioned polymers will be described hereinafter.

Preparation Method for Polymers Derived from the Compounds of the general Formulae (I) and (II)

In the preparation of the polymers comprising at least one of the compounds represented by the general formula (I) and at least one of the compounds represented by the general formula (II), each one of the compounds represented by the general formula (I) and the compounds represented by the general formula (II) may be used or these compounds may be used in combination for condensation polymerization.

In order to alter the properties (e.g., solubility, molecular weight) of the polymers, any suitable compounds may be added to the system during or after polymerization.

Examples of such compounds which can alter the properties of the polymers will be set forth below, but the present invention should not be construed as being limited thereto.

In particular, examples of such compounds include various solvents, inorganic and organic acids, inorganic and organic bases, phenols, inorganic and organic salts, epichlorohydrin, melamine, lignin, chroman, indene, xylene, thiophene, polyamide compound, fatty acid amide, polyvinyl alcohol, polyvinyl compound, ester, acid halide, halogenated alkyl, and carboxylic acid.

Specific examples of acid catalysts which can be used include inorganic protonic acids such as sulfuric acid, hydrochloric acid, perchloric acid, nitric acid and phosphoric acid, organic protonic acids such as p-toluenesulfonic acid, methanesulfonic acid, maleic acid, acetic acid and formic acid, boron trifluoride, complexes such as boron trifluoride-ether complex, and Lewis acid such as aluminum trichloride, tin tetrachloride, zinc chloride, ferric chloride and titanium tetrachloride. Preferred among these acid catalysts are protonic acids.

Specific examples of alkaline catalysts which can be used in the present invention include hydroxides, oxides, hydrides, carbonates, bicarbonates, alkoxides, phenoxides, carboxylates or amides of an alkali metal (such as lithium, sodium, potassium) or an alkaline earth metal (such as magnesium, calcium, barium).

Among these catalysts are preferred acid catalysts, with protonic acids being particularly preferred.

The amount of the acid or alkaline catalyst to be used is normally in the range of 0.1 to 70 mol % based on the compound of the general formula (I) and depends on the acidity or alkalinity and type thereof.

The synthesis of the above-mentioned polymers of the present invention can be accomplished by any suitable method as described in Shinichi Murayama, Phenol Resin, Nikkan Kogyo Shinbun Sha, 1981.

The content of the compound represented by the general formula (I) in the above-described polymers to be used in the present photographic light-sensitive material is preferably in the range of 10 to 95% by weight.

If the polymer-based stain inhibitor to be used contains long-chain alkyl groups (containing 6 or more carbon atoms) in the polymer, its weight average molecular weight is preferably in the range of 200 to 5,000. If it contains no long-chain alkyl groups, its weight average molecular weight is preferably in the range of 500 or more, particularly 2,000 or more. Furthermore, such long-chain alkyl groups can be incorporated into a polymer as a condensation product by polymeric reaction.

Preparation Method for Polymers Derived from the Compounds Represented by the General Formulae (I) and (III)

In the preparation of the polymers comprising at least one cf the compounds represented by the general formula (I) and at least one of the compounds represented by the general formula (III), each one of the compounds represented by the general formula (I) and the compounds represented by the general formula (III) may be used or these compounds may be used in combination for condensation polymerization.

In order to alter the properties (e.g., solubility, molecular weight) of the polymers, any suitable compounds may be added to the system during or after polymerization.

Examples of such compounds which can alter the properties of the polymers will be set forth below, but the present invention should not be construed as being limited thereto.

In particular, examples of such compounds include various solvents, inorganic and organic acids, inorganic and organic bases, phenols, inorganic and organic salts, epichlorohydrin, melamine, lignin, chroman, indene, xylene, thiophene, polyamide compound, fatty acid amide, polyvinyl alcohol, polyvinyl compound, ester, acid halide, halogenated alkyl, and carboxylic acid.

Specific examples of acid catalysts which can be used include inorganic protonic acids such as sulfuric acid, hydrochloric acid, perchloric acid, nitric acid and phosphoric acid, organic protonic acids such as p-toluenesulfonic acid, methanesulfonic acid, maleic acid, acetic acid and formic acid, boron trifluoride, complexes such as boron trifluoride-ether complex, and Lewis acid such as aluminum trichloride, tin tetrachloride, zinc chloride, ferric chloride and titanium tetrachloride. Preferred among these acid catalysts are protonic acids.

The amount of the acid catalyst to be used is normally in the range of 0.1 to 70 mol % based on the compound of the general formula (I) and depends on the acidity and type thereof.

As the solvent to be used there can be used an organic solvent such as alcohol, ether, ketone, ester and amide. In particular, it is necessary to select a solvent capable of dissolving a novolak resin produced by the reaction. Examples of such a solvent capable of dissolving novolak resins include alcohols such as methanol, ethanol, propanol, 2-propanol, butanol, methoxyethanol, 1-methoxy-2-propanol, 2-methoxy-1-propanol, ethoxyethanol, butoxyethanol and methoxyethoxyethanol, ethers such as dioxane, ethylene glycol dimethyl ether, ethylene glycol diethyl ether and ethylene glycol dibutyl ether, ketones such as acetone, methyl ethyl ketone and methyl isopropyl ketone, esters such as methoxyethyl acetate, ethoxyethyl acetate and butoxyethyl acetate, amides such as N,N-dimethylformamide and dimethylacetamide, and dimethyl sulfoxide. The present invention should not be construed as being limited to these compounds.

The content of the compound represented by the general formula (I) in the above-described polymers to be used in the present photographic light-sensitive material is preferably in the range of 10 to 95% by weight.

If the polymer-based stain inhibitor to be used contains long-chain alkyl groups (containing 6 or more carbon atoms) in the polymer, its weight average molecular weight is preferably in the range of 500 to 7,000. If it contains no long-chain alkyl groups, its weight average molecular weight is preferably in the range of 1,000 or more, particularly 3,000 or more. Furthermore, such long-chain alkyl groups can be incorporated into a polymer as a condensation product by polymeric reaction.

As the compound of the general formula (III) to be used in the present invention there can be used 2,5-dihydroxymethyl-p-cresol which is commercially available. If the physical properties, e.g., solubility and softening point, of the compound of the general formula (III) needs to be adjusted, such dihydroxymethylphenols can be easily synthesized from substituted phenols.

The synthesis of the compounds of the general formula (III) and the above-described present polymers can be accomplished by any suitable method as described in JP-A-1-289825.

Preparation Method for Polymers (Novolak) Derived from the Compounds of the General Formulae (I) and (IV)

The preparation of the present novolak resin can be accomplished by the method described below.

In particular, the present novolak resin can be obtained by a process which comprises allowing a compound of the general formula (I) and a compound of the general formula (IV) to undergo an azeotropic dehydration reaction in a single organic solvent capable of undergoing azeotropy with water or a mixture of such organic solvents in the presence of an acid catalyst in a stream of an inert gas such as nitrogen with stirring under heating conditions.

The preparation method for the present novolak resin will be further described hereinafter. Azeotropic Dehydration:

The preparation method for the present novolak resin is characterized by the removal from the reaction system of water produced by the condensation reaction of compounds of the general formulae (I) and (IV). Examples of the process for the removal of water from the reaction system include:

i Process which comprises evaporation of water with a solvent in a stream of an inert gas such as nitrogen upon reflux reaction under heating;

ii Process which comprises reflux of water through a drying agent (dehydrating agent) by means of a soxhlet extractor upon reflux reaction under heating; and iii Process which comprises exclusive trapping of water by a dean stark trap provided in the bottom of a cooling pipe (reflux condenser) and returning remaining solvents to the reaction system upon reflux reaction under heating.

Other dehydration processes can be used in the present invention. Solvent:

As the solvent to be used in the condensation reaction there can be preferably used a solvent capable of producing an azeotropic mixture with water. Examples of such a solvent include aromatic solvents such as benzene, toluene, o-xylene, p-xylene, and m-xylene, alcoholic solvents such as ethanol and isopropanol, ester solvents such as ethyl acetate, isopropyl acetate and butyl acetate, and halogenous solvents such as methane tetrachloride, chloroform and trichloroethane. Particularly preferred among these solvents are aromatic organic solvents which exhibit their minimum azeotropic point when mixed with water.

In the condensation of compounds of the general formulae (I) and (IV), the above-mentioned azeotropic solvent alone can be used. In order to uniformalize the reaction taking the solubility of the novolak resin produced into consideration, the above-mentioned azeotropic solvent can be used in admixture with an auxiliary solvent. Examples of such a solvent to be used as an auxiliary solvent include organic solvents such as alcohols, ethers, kitones, esters, and amides. In particular, it is necessary to select a solvent capable of dissolving a novolak resin produced by the reaction. Examples of such a solvent capable of dissolving a novolak resin include alcohols such as methanol, ethanol, propanol, 2-propanol, butanol, methoxyethanol, 1-methoxy-2-propanol, 2-methoxy-1-propanol, ethoxyethanol, butoxyethanol and methoxyethoxyethanol, ethers such as dioxane, ethylene glycol dimethyl ether, ethylene glycol diethyl ether and ethylene glycol dibutyl ether, ketones such as acetone, methyl ethyl ketone and methyl isopropyl ketone, esters such as methoxyethyl acetate, ethoxyethyl acetate and butoxyethyl acetate, amides such as N,N-dimethylformamide and dimethylacetamide, and dimethyl sulfoxide. The present invention should not be construed as being limited to these compounds.

The molar proportion of the present compound of the general formula (IV) to the present compound of the general formula (I) is preferably in the range of 0.5 to 2.0, particularly 0.8 to 1.5.

The molecular weight of an ordinary phenol novolak resin obtained in accordance with the present preparation method depends on the proportion of the compounds of the general formulae (I) and (IV). When it is desired to obtain a higher polymer, the proportion of the compound of the general formula (IV) is preferably 1 or more.

However, if the proportion of the compound of the general formulae (IV) to be used is 1.5 or more, it is somewhat disadvantageous in that a substitution reaction by the hydroxyl group portion of the compound of the general formula (I) can easily take place, reducing the hydroxyl group equivalent of the resin produced.

Acid Catalyst

Specific examples of acid catalysts which can be used include inorganic protonic acids such as sulfuric acid, hydrochloric acid, perchloric acid, nitric acid and phosphoric acid, organic protonic acids such as p-toluenesulfonic acid, methanesulfonic acid, maleic acid, acetic acid and formic acid, boron trifluoride, complexes such as boron trifluoride-ether complex, and Lewis acid such as aluminum trichloride, tin tetrachloride, zinc chloride, ferric chloride and titanium tetrachloride. Preferred among these acid catalysts are protonic acids.

The amount of the acid catalyst to be used is normally in the range of 0.1 to 70 mol % based on the compound of the general formula (I) and depends on the acidity and type thereof. Reaction Concentration:

The total charged amount of the compounds of the general formulae (I) and (IV) is preferably in the range of 10 to 70% by weight, particularly 20 to 50% by weight based on the solvents used. Reaction Temperature:

The present novolak resin can be prepared by reacting the compounds of the general formulae (I) and (IV) in the presence of the above-mentioned acid catalyst in an atmosphere of an inert gas such as nitrogen under heating. The temperature range is preferably in the range of 50° C. to 180° C. or up to the boiling point of the solvent used, particularly 70° C. to 150° C.

In the preparation of the polymers comprising at least one of the compounds represented by the general formula (I) and at least one of the compounds represented by the general formula (IV), each one of the compounds represented by the general formula (I) and the compounds represented by the general formula (IV) may be used or these compounds may be used in combination for condensation polymerization.

In order to alter the properties (e.g., solubility, molecular weight) of the polymers, any suitable compounds may be added to the system during or after polymerization.

Examples of such compounds which can alter the properties of the polymers will be set forth below, but the present invention should not be construed as being limited thereto.

In particular, examples of such compounds include various solvents, inorganic and organic acids, inorganic and organic bases, phenols, inorganic and organic salts, epichlorohydrin, melamine, lignin, chroman, indene, xylene, thiophene, polyamide compound, fatty acid amide, polyvinyl alcohol, polyvinyl compound, ester, acid halide, halogenated alkyl, and carboxylic acid.

The content of the compound represented by the general formula (I) in the above described novolak resins to be used in the present photographic light-sensitive material is preferably in the range of 10 to 95% by weight.

If the polymer-based stain inhibitor to be used in the present invention contains long-chain alkyl groups (containing 6 or more carbon atoms) in the polymer, its weight average molecular weight is preferably in the range of 1,000 to 8,000. If it contains no long-chain alkyl groups, its weight average molecular weight is preferably in the range of 1,000 or more, particularly 3,000 or more. Furthermore, such long-chain alkyl groups can be incorporated into a polymer as a condensation product by polymeric reaction.

Preparation Method for Polymers Derived from the compounds represented by the General Formulae (I) and (V)

The synthesis of these polymers can be accomplished by the method described below.

In particular, the present polymers can be obtained by the process which comprises allowing the compounds of the general formulae (I) and (V) to undergo a condensation reaction in the presence of an acid catalyst in a stream of an inert gas such as nitrogen in a uniform organic solvent with stirring under heating conditions.

The synthesis method for the present polymers, will be further illustrated hereinafter.

The proportion of the compounds of the general formulae (I) and (V) to be used will be described in detail below.

The molar proportion of the present compound of the general formula (V) to the present compound of the general formula (I) is preferably in the range of 0.5 to 2.0, particularly 0.7 to 1.5.

The molecular weight of the polymer obtained in accordance with the present preparation method depends on the proportion of the compounds of the general formulae (I) and (V). When it is desired to obtain a higher polymer, the proportion of the compound of the general formula (IV) is preferably 0.8 or more.

However, if the proportion of the compound of the general formula (V) to be used is 1.5 or more, it is somewhat disadvantageous in that a substitution reaction by the hydroxyl group portion of the compound of the general formula (I) can easily take place, reducing the hydroxyl group equivalent of the resin produced.

Specific examples of acid catalysts which can be used include inorganic protonic acids such as sulfuric acid, hydrochloric acid, perchloric acid, nitric acid and phosphoric acid, organic protonic acids such as p-toluenesulfonic acid, methanesulfonic acid, maleic acid, acetic acid and formic acid, boron trifluoride, complexes such as boron trifluoride-ether complex, and Lewis acid such as aluminum trichloride, tin tetrachloride, zinc chloride, ferric chloride and titanium tetrachloride. Preferred among these acid catalysts are protonic acids.

The amount of the acid catalyst to be used is normally in the range of 0.1 to 70 mol % based on the compound of the general formula (I) and depends on the acidity and type thereof.

As the solvent to be used in the synthesis of the present polymers there can be used an organic solvent such as alcohol, ether, ketone, ester and amide. In particular, it is necessary to select a solvent capable of dissolving a polymer produced by the reaction. Examples of such as a solvent capable of dissolving a polymer include alcohols such as methanol, ethanol, propanol, 2-propanol, butanol, methoxyethanol, 1-methoxy-2-propanol, 2-methoxy-1 propanol, ethoxyethanol, butoxyethanol and methoxyethoxyethanol, ethers such as dioxane, ethylene glycol dimethyl ether, ethylene glycol diethyl ether and ethylene glycol dibutyl ether, ketones such as acetone, methyl ethyl ketone and methyl isopropyl ketone, esters such as methoxyethyl acetate, ethoxyethyl acetate and butoxyethyl acetate, amides such as N,N-dimethylformamide and dimethylacetamide, and dimethyl sulfoxide. The present invention should not be construed as being limited to these compounds.

The reaction concentration will be described hereinafter.

The total charged amount of the compounds of the general formulae (I) and (V) is preferably in the range of 10 to 70% by weight, particularly 20 to 50% by weight based on the solvents used.

The reaction temperature will be described hereinafter.

The present polymers can be prepared by reacting the compounds of the general formulae (I) and (V) in the presence of the above mentioned acid catalyst in an atmosphere of an inert gas such as nitrogen under heating. The temperature range is preferably in the range of 30° C. to 150° C. or up to the boiling point of the solvent used, particularly 40° C. to 100° C.

In the preparation of the polymers comprising at least one of the compounds represented by the general formula (I) and at least one of the compounds represented by the general formula (V), each one of the compounds represented by the general formula (I) and the compounds represented by the general formula (V) may be used or these compounds may be used in combination for condensation polymerization.

In order to alter the properties (e.g., solubility, molecular weight) of the polymers, any suitable compounds may be added to the system during or after polymerization.

Examples of such compounds which can alter the properties of the polymers will be set forth below, but the present invention should not be construed as being limited thereto.

In particular, examples of such compounds include various solvents, inorganic and organic acids, inorganic and organic bases, phenols, inorganic and organic salts, epichlorohydrin, melamine, lignin, chroman, indene, xylene, thiophene, polyamide compound, fatty acid amide, polyvinyl alcohol, polyvinyl compound, ester, acid halide, halogenated alkyl, and carboxylic acid.

The content of the compound represented by the general formula (I) in the above described polymers to be used in the present photographic light-sensitive material is preferably in the range of 10 to 95% by weight.

If the polymer-based stain inhibitor to be used in the present invention contains long-chain alkyl groups (containing 6 or more carbon atoms) in the polymer, its weight average molecular weight is preferably in the range of 1,000 to 8,000. If it contains no long-chain alkyl groups, its weight average molecular weight is preferably in the range of 1,000 or more, particularly 3,000 or more. Furthermore, such long-chain alkyl groups can be incorporated into a polymer as a condensation product by polymeric reaction.

Specific examples of the synthesis method for typical polymers of the present invention will be set forth below.

SYNTHESIS EXAMPLE 1: (Synthesis of Polymer 1)

50 ml of ethanol was added to 22 g (0.2 mol) of a commercially available catechol and 17 g (0.2 mol) of a commercially available formalin (35%). The mixture was stirred while the internal temperature thereof was kept at 90° C. The material was then allowed to undergo reaction in the presence of 3 ml of a 1N hydrochloric acid as a catalyst over 8 hours. After the reaction completed, the unreacted catechol and formalin were removed by steam distillation. The remaining resin was then dissolved in 30 ml of methanol. The material was reprecipitated in 300 ml of water for purification, and then dried to obtain 18 g of the desired material (average molecular weight: 1,500).

SYNTHESIS EXAMPLE 2: (Synthesis of Polymer 2)

12.6 g (0.1 mol per unit) of Polymer 1 obtained in Synthesis Example 1 and 2.5 g (0.025 mol) of triethylamine were dissolved in 100 ml of THF (tetrahydrofuran). 6.9 g (0.025 mol) of palmitoyl chloride was added dropwise to the solution while the internal temperature thereof was kept at 10° C. or lower with ice. After the dropwise addition completed, the material was allowed to undergo reaction over 3 hours. The reaction solution was then added to 500 ml of water with stirring. The material was washed with 200 ml of water three times, and then dried under reduced pressure to obtain 16.5 g of the desired material (polymer).

The weight average molecular weight of the polymer was 2,500.

SYNTHESIS EXAMPLE 3

Polymers 3 to 23 of the present invention were obtained in accordance with the above mentioned method.

| Present Compound (Polymer) | Reaction Reagent (I) | Reaction Reagent (II) | Modifying Reagent (a) | Post Treatment Reagent (b) | % weight ratio (I)/(II)/(a)/(b) |
|---|---|---|---|---|---|
| 3 | 1 | 1 | 4-dodecyloxyphenol (OH-C₆H₄-OC₁₂H₂₅) | — | 47/13/40/— |
| 4 | 1 | 1 | — | C₁₅H₃₁COCl | 50/13/—/37 |
| 5 | 1 | 5 | — | — | 46/54/—/— |
| 6 | 1 | 6 | — | — | 37/63/—/— |
| 7 | 2 | 1 | 2,4-di-tert-butylphenol | — | 51/14/35/— |
| 8 | 3 | 1/6* | — | — | 56/44/—/— |
| 9 | 8 | 4 | — | — | 75/25/—/— |
| 10 | 9 | 1 | — | — | 90/10/—/— |
| 11 | 9 | 1 | o-cresol (2-methylphenol) | — | 80/9/11/— |
| 12 | 1 | 7 | — | — | 42/68/—/— |
| 13 | 8 | 5 | — | — | 63/37/—/— |
| 14 | 8 | 7 | — | — | 68/32/—/— |
| 15 | 8 | 8 | — | — | 70/30/—/— |
| 16 | 8 | 12 | — | — | 77/23/—/— |
| 17 | 8 | 18 | — | — | 85/15/—/— |
| 18 | 16 | 13 | — | C₁₇H₃₅COCl | 46/23/—/31 |
| 19 | 19 | 1 | — | — | 82/18/—/— |
| 20 | 22 | 1 | — | C₁₇H₃₅COCl | 50/12/—/38 |
| 21 | 22 | 1 | 4-dodecylphenol (OH-C₆H₄-C₁₂H₂₅) | — | 50/13/37 |
| 22 | 22/23* | 1 | " | — | 53/14/33 |
| 23 | 4 | 1 | " | — | 60/14/36 |

*(equimolecular)

SYNTHESIS EXAMPLE 4: (Synthesis of Polymer 24 of the present invention)

1.2 g (8 mmol) of phosphorus oxychloride was added as a catalyst to 10 g (80 mmol) of a commercially available pyrogallol and 30 g (0.5 mol) of acetone with stirring at room temperature. The material was then heated until acetone was refluxed. The material was then allowed to undergo reaction over 8 hours. 50 g of acetone was added to the material. The material was then cooled to room temperature. After cooling, the reaction solution was then reprecipitated in 500 ml of water. (The average molecular weight of the polymer was 3,900.)

SYNTHESIS EXAMPLE 5: (Synthesis of Polymer 25 of the present invention)

11.8 g of Polymer 25 was prepared in the same manner as in Synthesis Example 4 except that phosphorus oxychloride was used in an amount of 4.8 g (32 mmol). (The average molecular weight of the polymer was 9,000.)

SYNTHESIS EXAMPLE 6

Polymers 26 to 38 of the present invention were prepared in accordance with the above mentioned method.

| Present Compound (Polymer) | Reaction Reagent (I) | Reaction Reagent (II) | Post Treatment Reagent (c) | Molar Ratio (I)/(II)/(c) (based on (I) as 10) |
|---|---|---|---|---|
| 26 | 23 | 20 | — | 10/63/— |
| 27 | 23 | 21 | — | 10/63/— |
| 28 | 23 | 24 | — | 10/63/— |
| 29 | 23 | 30 | — | 10/63/— |
| 30 | 23 | 19 | $C_{13}H_{27}COCl$ | 10/63/2 |
| 31 | 28 | 19 | — | 10/80/— |
| 32 | 29 | 19 | — | 10/80/— |
| 33 | 22 | 19 | — | 10/63/— |
| 34 | 22 | 20 | — | 10/63/— |
| 35 | 22 | 19 | $C_{17}H_{35}COCl$ | 10/80/4 |
| 36 | 25 | 19 | — | 10/63/— |
| 37 | 25 | 24 | — | 10/80/— |
| 38 | 25 | 19 | $C_{15}H_{31}COCl$ | 10/80/4 |

SYNTHESIS EXAMPLE 7: (Synthesis of Polymer 39 of the present invention)

150 ml of ethanol was added to 44 g (0.4 mol) of I-1, 40.6 (0.6 mol) of I-32 and 51 g (0.6 mol) of a commercially available formaline. The mixture was then stirred while the internal temperature thereof was kept at 90° C. 3 ml of 1 N hydrochloric acid was added to the material. The material was stirred over 8 hours. Thereafter, the unreacted I-1 and formaline were removed by steam distillation to concentrate the material. The material was then purified with a methanol/acetone mixture (4/1 by volume) as a developing solvent through a column filled with Cephadex to obtain 43 g of the desired material. (The average molecular weight of the polymer was 1,100.)

SYNTHESIS EXAMPLE 8

Polymers 40 to 46 of the present invention were prepared in accordance with the above mentioned synthesis method.

| Present Compound (Polymer) | Reaction Reagent | Molar Ratio |
|---|---|---|
| 40 | I-1/I-8/II-1 | 5/1/6 |
| 41 | I-2/I-9/II-1 | 10/1/11 |
| 42 | I-5/I-32/II-1 | 5/5/11 |
| 43 | I-22/I-23/II-19 | 1/1/20 |
| 44 | I-22/II-19/II-20 | 1/10/10 |
| 45 | I-22/II-1/II-19 | 2/1/10 |
| 46 | I-1/I-22/II-1/II-19 | 1/1/1/10 |

SYNTHESIS EXAMPLE 9

(1) Synthesis of Compound (III)-3

103.2 g (0.5 mol) of p-t-octylphenol, 43.0 g (1.5 mol) of paraformaldehyde, 100 ml of methanol and 200 ml of distilled water were stirred in a reaction vessel. An aqueous solution of sodium hydroxide obtained by dissolving 25.0 g (12.5 mol) of sodium hydrochloride in 200 ml of distilled water was added to the material. The material was allowed to undergo reaction at an internal temperature of 60° C. over 3 hours. After the reaction completed, the material was cooled with ice. The material was neutralized with hydrochloric acid. The material was extracted with ethyl acetate, washed with water, and then dried with magnesium sulfate. The drying agent was then filtered off. The ethyl acetate solution was concentrated. The residue was dissolved in hexane at an elevated temperature. The solution was cooled so that the material was crystallized. The resulting crystal was then filtered off, and dried to obtain 82.3 g of 2,6-dihydroxymethyl-p-t-octylphenol (yield: 62.0%; melting point: 76°–77° C.).

(2) Synthesis of Polymer 101

33.0 g (0.3 mol) of hydroquinone, 64.0 g (0.24 mol) of 2,6-dihydroxymethyl-p-t-octylphenol obtained in the foregoing paragraph (1) and 150 g of 1-methoxy-2-propanol were stirred in a reaction vessel in a stream of nitrogen at room temperature. 0.3 g (0.01 mol) of sulfuric acid was added to the material as an acid catalyst. The material was then gradually heated in an oil bath. The material was then allowed to undergo a reflux reaction (in an oil bath having a temperature of about 125° C.) over 7 hours. The reaction system was then cooled to finish the reaction. The material was then diluted with 100 g of 1-methoxy-2-propanol. The material was reprecipitated in 3.0 l of water with stirring. The resulting white precipitate was filtered off, washed with water twice or thrice, and then dried in a vacuum drier.

The material was then purified with a methanol/acetone mixture (1/1 by volume) as a developing solvent through a column filled with Cephadex to obtain 41.0 g of the desired material. The weight average molecular weight of the polymer was 11,200.

The molecular weight of the polymer was determined by gel permeation chromatography (GPC). In the GPC measurement, a Type HLC803D gel permeation chromatograph manufactured by Tosoh Corporation was used. As column there were used Type TSK-GEL columns (4000H, 2000H) manufactured by Tosoh Corporation. As an eluting solution there was used THF. The flow rate of the eluting solution was 1.0 ml/min. The column temperature was 40° C. Under these conditions, the absorption wavelength in ultraviolet absorption (254 nm) was determined.

SYNTHESIS EXAMPLE 10: (Synthesis of Polymer 102)

50.0 g (0.3 mol) of t-butylcatechol, 35.3 g (0.21 mol) of 2,6-dihydroxymethyl-p-cresol, 0.3 g (0.01 mol) of sulfuric acid and 120 g of 1-methoxy-2-propanol were allowed to undergo reaction in the same manner as in Synthesis Example 9-(2). The product dried was then purified through a column filled with Cephadex as a carrier to obtain 35.5 g of the desired material. The weight average molecular weight was 2,340.

SYNTHESIS EXAMPLE 11: (Synthesis of Polymer 103)

33.0 g (0.3 mol) of hydroquinone, 35.3 g (0.21 mol) of 2,6-dihydroxymethyl-p-cresol, 0.3 g (0.01 mol) of sulfuric acid and 120 g of 1-methoxy-2-propanol were allowed to undergo reaction in the same manner as in Synthesis Example 9-(2). The product was purified in the same as in Synthesis Example 9-(2) to obtain 35.2 g of the desired material. The weight average molecular weight of the polymer was 5,860.

SYNTHESIS EXAMPLE 12: (Synthesis of Polymer 104)

24.2 g (0.1 mol per unit) of Polymer 103 of the present invention obtained in Synthesis Example 11 and 2.5 g (0.025 mol) of triethylamine were dissolved in 100 ml of THF. 6.9 g (0.025 mol) of palmitoyl chloride was added dropwise to the solution while the internal temperature thereof was kept at 10° C. or lower with ice. After the dropwise addition completed, the material was allowed to undergo reaction at room temperature over 3 hours. The reaction solution was added to 500 ml of water with stirring. The reaction product was then washed with water three times, and dried under reduced pressure to obtain 28.5 g of the desired material (polymer).

The weight average molecular weight of the polymer was 6,100.

SYNTHESIS EXAMPLE 13

Polymers 105 to 115 were prepared in accordance with the above mentioned method.

| Present Compound (Polymer) | Reaction Reagent (I) | Reaction Reagent (III) | % Weight Ratio (I) | % Weight Ratio (III) | Weight Average Molecular Weight |
|---|---|---|---|---|---|
| 105 | 1 | 2 | 43 | 57 | 3,440 |
| 106 | 1 | 5 | 33 | 67 | 4,200 |
| 107 | 1 | 6 | 34 | 66 | 6,470 |
| 108 | 1 | 15 | 44 | 56 | 3,100 |
| 109 | 2 | 1 | 57 | 43 | 2,850 |
| 110 | 2 | 5 | 33 | 67 | 1,880 |
| 111 | 5 | 1 | 60 | 40 | 1,260 |
| 112 | 6 | 1 | 61 | 39 | 1,090 |
| 113 | 14 | 3 | 47 | 53 | 2,200 |
| 114 | 16 | 3 | 44 | 56 | 1,530 |
| 115 | 23 | 5 | 34 | 66 | 1,760 |

SYNTHESIS EXAMPLE 14: (Synthesis of Polymer 201)

46.2 g (0.42 mol) of catechol, 42.1 g (0.42 mol) of capronaldehyde, 33 g of methoxyethanol and 76 g of benzene were stirred in a reaction vessel in a stream of nitrogen at room temperature. 3.8 g (0.02 mol) of p-toluenesulfonic acid was added to the material as a catalyst. The mixture was then gradually heated in an oil bath. The reaction was then effected over 4 hours while the separation of water was confirmed by a water content determining and receiving apparatus provided in the bottom of the condenser during a reflux reaction (oil bath temperature: 130°–140° C.). At this point, the amount of water separated was 9 ml. The reaction solution was then cooled to room temperature. The reaction solution was extracted with 250 ml of ethyl acetate. The material was then washed with water three times. Thereafter, the ethyl acetate solution was dried with magnesium sulfate, filtered off, concentrated, and then dried by a vacuum pump.

Yield: 68 g (84.3%)

Weight average molecular weight: 3,200.

Dispersion (MW/MN): 3.1.

The molecular weight of the polymer was determined by gel permeation chromatography (GPC). In the GPC measurement, a Type HLC8020 gel permeation chromatograph manufactured by Tosoh Corporation was used. As columns there were used Type TSK-GEL columns (4000H, 2000H) manufactured by Tosoh Corporation. As an eluting solution there was used THF. The flow rate of the eluting solution was 1.0 ml/min. The column temperature was 40° C. Under these conditions, the absorption wavelength in ultraviolet absorption (254 nm) was determined.

As a reference specimen there was used polystyrene.

SYNTHESIS EXAMPLE 15: (Synthesis of Polymer 202)

19.2 g (0.1 mol per unit) of Polymer 201 obtained in Synthesis Example 14 and 2.5 g (0.025 mol) of triethylamine were dissolved in 100 ml of THF. 6.8 g (0.025 mol) of palmitoyl chloride was added dropwise to the material while the internal temperature thereof was kept at 10° C or lower with ice. The material was allowed to undergo reaction over 2 hours while being cooled with ice. The reaction solution was then extracted with 200 ml of ethyl acetate. The material was washed with water three times.

The ethyl acetate solution was dried with Glauber's salt. The drying agent was filtered off. The filtrate was concentrated, and then dried by a vacuum pump.

Yield: 21.5 g (92.8%)

SYNTHESIS EXAMPLE 16: (Synthesis of Polymer 203)

61.6 g (0.56 mol) of hydroquinone, 65.4 g (0.62 mol) of benzaldehyde, 100 g of methoxyethanol and 100 g of toluene were stirred in a reaction vessel in a stream of nitrogen at room temperature. 8.6 g (0.05 mol) of hydrobromic acid (47%) was added to the mixture as a catalyst. The material was then gradually heated in an oil bath. The material was allowed to undergo reaction over 3 hours while water produced by the reflux reaction (oil bath temperature: 135°–145° C.) was evaporated with toluene along with a stream of nitrogen. The reaction solution was then cooled and dissolved in 100 ml of methoxyethanol. The solution was poured into 2 l of water with stirring so that the material was reprecipitated. The resulting precipitate was filtered off, washed with water twice or three times, and then dried in a vacuum drier.

Yield: 109 g (93.1%).

Weight average molecular weight: 12,900.

Dispersion (MW/MN): 2.9.

SYNTHESIS EXAMPLE 17: (Synthesis of Polymer 204)

28.6 g (0.26 mol) of hydroquinone, 33.5 g (0.26 mol) of n-octylaldehyde, 50 g of 1-methoxy-2-propanol and 50 g of toluene were stirred in a reaction vessel in a stream of nitrogen at room temperature. 2.6 g (0.03 mol) of sulfuric acid was added to the material as a catalyst. The mixture was then gradually heated in an oil bath. The reaction was then effected over 5 hours while the separation of water was confirmed by a water content determining and receiving apparatus provided in the bottom of the condenser during a reflux reaction (oil bath temperature: 130°–140° C.). At this point, the amount of water separated was 5.3 ml. The reaction solution was then cooled to room temperature. The reaction solution was extracted with 300 ml of ethyl acetate. The material was then washed with water three times. Thereafter, the ethyl acetate solution was dried with magnesium sulfate, filtered off, concentrated, and then dried by a vacuum pump.

Yield: 52 g (90.4%).

Weight average molecular weight: 3,000.

Dispersion (MW/MN): 3.5 .

SYNTHESIS EXAMPLE 18: (Synthesis of Polymer 205)

33.0 g (0.3 mol) of hydroquinone, 55.3 g (0.3 mol) of n-dodecylaldehyde, 75 g of 1-methoxy-2-propanol and 75 g of toluene were stirred in a reaction vessel in a stream of nitrogen at room temperature. 2.9 g (0.03 mol) of sulfuric acid was added to the material as a catalyst.

The material was then allowed to undergo reaction in the same manner as in Synthesis Example 17.

Polymers 206 to 210 were prepared in the same manner as described above except that the proportion of n-dodecylaldehyde based on the molar proportion of hydroquinone was altered.

The results are set forth in the table below.

| Present Compound (Polymer) | Proportion of n-dodecyl-aldehyde | Weight Average Molecular Weight | Dispersion |
|---|---|---|---|
| 205 | 1.0 | 3,200 | 3.6 |
| 206 | 0.8 | 2,800 | 5.0 |
| 207 | 0.9 | 2,900 | 4.7 |
| 208 | 1.1 | 3,500 | 3.3 |
| 209 | 1.2 | 3,800 | 4.2 |
| 210 | 1.4 | 4,100 | 4.2 |

SYNTHESIS EXAMPLE 19: (Synthesis of Polymer 211)

16.5 g (0.15 mol) of hydroquinone, 33 g (0.15 mol) of p-nonylphenol, 9 g (0.3 mol) of paraformaldehyde and 80 g of 1-methoxy-2-propanol were stirred in a reaction vessel in a stream of nitrogen at room temperature. 10 g (0.1 mol) of phosphoric acid was added to the material as a catalyst. The material was then allowed to undergo reaction and post-treatment in the same manner as in Synthesis Example 16.

Polymers 212 to 214 were prepared in the same manner as described above except that the molar proportions of hydroquinone and p-nonylphenyl were altered.

The results are set forth in the table below.

| Present Compound (Polymer) | Molar Amount of Hydroquinone | Molar Amount of p-Nonylphenol | Weight Average Molecular Weight | Dispersion |
|---|---|---|---|---|
| 211 | 0.150 | 0.150 | 1,900 | 4.3 |
| 212 | 0.225 | 0.075 | 2,300 | 4.2 |
| 213 | 0.255 | 0.045 | 2,450 | 3.6 |
| 214 | 0.285 | 0.015 | 2 800 | 2.9 |

SYNTHESIS EXAMPLE 20

Polymers 215 to 228 were prepared in accordance with the above mentioned method.

| Present Compound (Polymer) | Reaction Reagent (I) | Reaction Reagent (IV) | Post Treatment Reagent (d) | Molar Ratio (I)/(IV)/(d) |
|---|---|---|---|---|
| 215 | 2 | 7 | $C_{11}H_{23}COCl$ | 34/48/18 |
| 216 | 2 | 27 | $C_{11}H_{23}COCl$ | 17/73/10 |
| 217 | 29 | 1 | $C_{11}H_{23}COCl$ | 55/20/25 |
| 218 | 5 | 8 | — | 36/64/— |
| 219 | 7 | 8 | — | 43/57/— |
| 220 | 8 | 8 | — | 49/51/— |
| 221 | 13 | 23 | — | 52/48/— |
| 222 | 14 | 23 | — | 69/31/— |
| 223 | 16 | 23 | — | 51/49/— |
| 224 | 1 | 29 | — | 43/57/— |
| 225 | 1 | 32 | — | 38/62/— |
| 226 | 1 | 33 | — | 39/61/— |
| 227 | 1 | 34 | — | 40/60/— |
| 228 | 28 | 26 | — | 62/38/— |

SYNTHESIS EXAMPLE 21: (Synthesis of Polymer 301)

44.0 g (0.40 mol) of catechol, 82.7 g (0.44 mol) of n-octylaldehyde dimethylacetal, 120 g of 1-methoxy-2-propanol and 50 g of toluene were stirred in a reaction vessel in a stream of nitrogen at room temperature. 3.9 g (0.04 mol) of sulfuric acid was added to the material as a catalyst. The material was then gradually heated in a water bath. The material was allowed to undergo reaction at a bath temperature of 40° C. over 3 hours. The reaction solution was then cooled to room temperature. The reaction solution was extracted with 300 ml of ethyl acetate, and then washed with water three times. The ethyl acetate solution was dried with magnesium sulfate. The drying agent was filtered off. The solution was then concentrated. The material was dried by a vacuum pump.

Yield: 85 g (95.5%).
Weight average molecular weight: 5,100.
Dispersion (MW/MN): 3.1.

The weight average molecular weight of the polymer was determined by gel permeation chromatography (GPC). In the GPC measurement, a Type HLC8020 gel permeation chromatograph manufactured by Tosoh Corporation was used. As columns there were used Type TSK-GEL columns (4000H, 2000H) manufactured by Tosoh Corporation. As an eluting solution there was used THF. The flow rate of the eluting solution was 1.0 ml/min. The column temperature was 40° C. Under these conditions, the absorption wavelength in ultraviolet absorption (254 nm) was determined.

As a reference specimen there was used polystyrene.

SYNTHESIS EXAMPLE 22: (Synthesis of Polymer 302)

33.0 g (0.3 mol) of hydroquinone, 69.1 g (0.3 mol) of n dodecylaldehyde dimethylacetal, and 100 g of 1-methoxy-2-propanol were stirred in a reaction vessel in a stream of nitrogen at room temperature. 2.9 g (0.03 mol) of sulfuric acid was added to the material as a catalyst. The material was allowed to undergo reaction in the same manner as in Synthesis Example 21.

Polymers 303 to 307 were prepared in the same manner as in Synthesis Example 22 except that the proportion of n-dodecylaldehyde dimethylacetal based on the molar proportion of hydroquinone was altered.

The results are set forth in the table below.

| Present Compound (Polymer) | Proportion of n-dodecyl-aldehyde dimethylacetal | Weight Average Molecular Weight | Dispersion |
|---|---|---|---|
| 302 | 1.0 | 5,900 | 2.2 |
| 303 | 0.8 | 4,800 | 1.8 |
| 304 | 0.9 | 5,200 | 2.1 |
| 305 | 1.1 | 6,200 | 1.9 |
| 306 | 1.2 | 6,700 | 2.1 |
| 307 | 1.4 | 7,200 | 2.2 |

SYNTHESIS EXAMPLE 23: (Synthesis of Polymer 308)

57.2 g (0.52 mol) of hydroquinone, 78.8 g (0.52 mol) of benzaldehyde dimethylacetal, and 150 g of 1-methoxy-2-propanol were stirred in a reaction vessel in a stream of nitrogen at room temperature. 5.1 g (0.05 mol) of sulfuric acid was added to the material as a catalyst. The material was then gradually heated in a water bath. The material was allowed to undergo reaction at a bath temperature of 80° C. over 4 hours. The reaction solution was then cooled to room temperature. 100 ml of 1-methoxy-2-propanol was dissolved in the reaction solution. The material was then reprecipitated in 2.5 of water with stirring. The precipitate was filtered off, washed with water twice or thrice and then dried in a vacuum drier.

Yield: 117 g (98.9%).
Weight average molecular weight: 24,500.
Dispersion (MW/MN): 3.1.

SYNTHESIS EXAMPLE 24: (Synthesis of Polymer 309)

33.5 g (0.31 mol) of hydroquinone, 72.1 g (0.31 mol) of p-n-butoxybenzaldehyde dimethylacetal, and 150 g of 1-methoxy-2-propanol were stirred in a reaction vessel in a stream of nitrogen at room temperature. 2.9 g (0.03 mol) of sulfuric acid was added to the material as a catalyst. The material was then gradually heated in a water bath. The material was allowed to undergo reaction at a bath temperature of 80° C. over 4 hours. The reaction solution was then cooled to room temperature. 100 ml of 1-methoxy-2-propanol was dissolved in the reaction solution. The material was then reprecipitated in 3.0 of water with stirring. The precipitate was filtered off, washed with water twice or thrice, and then dried in a vacuum drier.

Yield: 82 g (96.8%).
Weight average molecular weight: 19,500.
Dispersion (MW/MN): 3.4.

SYNTHESIS EXAMPLE 25: (Synthesis of Polymer 310)

16.5 g (0.15 mol) of hydroquinone, 33 g (0.15 mol) of p-nonylphenol, 35.5 g (0.3 mol) of acetaldehyde diethylacetal, and 150 g of 1-methoxy-2-propanol were stirred in a reaction vessel in a stream of nitrogen at room temperature. 2.9 g (0.03 mol) of sulfuric acid was added to the material as a catalyst. The material was then allowed to undergo reaction and post-treatment in the same manner as in Synthesis Example 23.

Polymers 311 to 313 were prepared in the same manner as in Synthesis Example 25 except that the molar proportions of hydroquinone and p-nonylphenol were altered.

The results are set forth in the table below.

| Present Compound (Polymer) | Molar Amount of Hydroquinone | Molar Amount of p-Nonylphenol | Weight Average Molecular Weight | Dispersion |
|---|---|---|---|---|
| 310 | 0.150 | 0.150 | 3,100 | 3.1 |
| 311 | 0.225 | 0.075 | 3,800 | 3.3 |
| 312 | 0.255 | 0.045 | 3,900 | 3.1 |
| 313 | 0.285 | 0.015 | 4,300 | 3.5 |

Synthesis Example 26:

Polymers 314 to 327 were prepared in accordance with the above-mentioned method.

| Present Compound (Polymer) | Reaction Reagent (I) | Reaction Reagent (V) | Post Treatment Reagent (e) | % Weight Ratio (I)/(V)/(e) |
|---|---|---|---|---|
| 314 | 2 | 2 | $C_{11}H_{23}COCl$ | 39/42/19 |
| 315 | 2 | 12 | $C_{11}H_{23}COCl$ | 41/38/21 |
| 316 | 29 | 19 | $C_{11}H_{23}COCl$ | 34/52/14 |
| 317 | 5 | 3 | — | 51/49/— |
| 318 | 7 | 3 | — | 58/42/— |
| 319 | 8 | 3 | — | 65/35/— |
| 320 | 1 | 2 | — | 48/52/— |
| 321 | 1 | 3 | — | 48/52/— |
| 322 | 1 | 4 | — | 39/61/— |
| 323 | 1 | 9 | — | 41/59/— |
| 324 | 8 | 24 | — | 67/33/— |
| 325 | 14 | 24 | — | 61/39/— |
| 326 | 17 | 24 | — | 63/37/— |
| 327 | 19 | 24 | — | 60/30/— |

The present compounds may be incorporated in silver halide emulsion layers or light-insensitive layers, preferably in light-insensitive layers. The same present compound may be incorporated in different layers. Alternatively, two or more different compounds may be incorporated in the same layer. The amount of the present compounds to be incorporated is in the range of $1 \times 10^{-6}$ to $1 \times 10^{-3}$ mol/m$^2$, preferably $1 \times 10^{-5}$ to $1 \times 10^{-3}$ mol/m$^2$ as calculated in terms of unit derived from the compound of the general formula (I).

Particularly preferably, at least one of the present compounds is incorporated into an interlayer (color stain inhibiting layer) to be provided between emulsion layers having different color sensitivity from each other.

The present compounds may be preferably used as color stain inhibitors. Furthermore, the present compounds may be incorporated in silver halide emulsion layers as color fog inhibitors. In this case, the amount of the present compounds to be incorporated is in the range of $1 \times 10^{-7}$ to $1 \times 10^{-4}$ mol/m$^2$, preferably $1 \times 10^{-6}$ to $1 \times 10^{-4}$ mol/m$^2$ as calculated in terms of unit derived from the compound of the general formula (I).

The incorporation of the present compounds or the dye providing compounds described later in the light-sensitive material can be accomplished by any known dispersion method. Typical examples of such known dispersion methods include solid dispersion process, alkali dispersion process, latex dispersion process, and oil-in-water dispersion process. Preferred among these dispersion processes are latex dispersion process and oil-in-water dispersion process. Particularly preferred among these processes is oil-in-water dispersion process. In the oil-in-water dispersion process, the present compounds may be dissolved in either a high boiling organic solvent having a boiling point of 175° C. or a low boiling solvent, i.e., so-called auxiliary solvent or a mixture thereof. The solution is then finely dispersed in water or an aqueous medium such as aqueous solution of gelatin in the presence of a surface active agent. Examples of such a high boiling organic solvent are described in U.S. Pat. No. 2,322,027. The dispersion may involve phase inversion. The auxiliary solvent may be optionally removed or reduced by distillation, noodle rinse or ultrafiltration before coating.

Specific examples of high boiling organic solvents include phthalic esters (such as dibutyl phthalate, dicyclohexyl phthalate, di-2-ethylhexyl phthalate, didodecyl phthalate), phosphoric or phosphonic esters (e.g., triphenyl phosphate, tricresyl phosphate, 2-ethylhexyldiphenyl phosphate, tricyclohexyl phosphate, tri-2-ethylhexyl phosphate, tridecyl phosphate, tributoxyethyl phosphate, trichloropropyl phosphate, di-2-ethylhexylphenyl phosphonate), benzoic esters (e.g., 2-ethylhexyl benzoate, dodecyl benzoate, 2-ethylhexyl-p-hydroxy benzoate), amides (e.g., diethyldodecanamide, N-tetradecylpyrrolidone), alcohols or phenols (e.g., isostearyl alcohol, 2,4-di-tertamylphenol), aliphatic carboxylic esters (e.g., dioctyl azerate, glycerol tributyrate, isostearyl lactate, trioctyl citrate), aniline derivatives (e.g., N,N-dibutyl-2-butoxy-5-tert-octylaniline), and hydrocarbons (e.g., paraffin, dodecylbenzene, diisopropylnaphthalene). As auxiliary solvents there can be used those having a boiling point of about 30° C. to about 160° C. Typical examples of such auxiliary solvents include ethyl acetate, butyl acetate, ethyl propionate, methyl ethyl ketone, cyclohexanone, 2-ethoxyethyl acetate, and dimethylformamide.

The latex dispersion process can be used to disperse the present compounds in the light-sensitive material. Specific examples of the latex process, its effects and latexes to be used in the process are described in U.S. Pat. No. 4,199,363 and German Patent OLS Nos. 2,541,274 and 2,541,230.

A preferred embodiment of the present color diffusion transfer photographic material comprises a combination of a blue-sensitive emulsion layer, a green-sensitive emulsion layer and a red-sensitive emulsion layer, a combination of a green-sensitive emulsion layer, a red-sensitive emulsion layer and an infrared-sensitive emulsion layer or a combination of a blue-sensitive emulsion layer, a red-sensitive emulsion layer and an infrared-sensitive emulsion layer, each of the emulsion layers being combined with a yellow dye providing compound, a magenta dye providing compound and a cyan dye providing compound, respectively (the term "infrared-sensitive emulsion layer" as used herein means an emulsion layer sensitive to light having a wavelength of 700 nm or more, particularly 740 nm or more).

In the present invention, the silver halide emulsion layer combined with a dye providing compound which releases or produces a diffusible dye (hereinafter referred to as "dye providing compound") is a layer in which a silver halide emulsion and a dye providing compound are incorporated in the same layer or in separate adjacent layers.

In a typical embodiment of film unit to be used in color diffusion transfer, an image-receiving element and a light-sensitive element are laminated on a transparent support. In this arrangement, it is not necessary that the light-sensitive element be peeled off the image-receiving element after the completion of transfer images. The image-receiving element consists of at least one mordant layer. Between the mordant layer and the light-sensitive layer or the dye providing compound-containing layer is provided a white reflective layer containing a solid pigment such as titanium oxide so that transfer images can be viewed through the transparent support.

In order to enable development in daylight, a light-shielding layer may be provided between the white reflective layer and the light-sensitive layer. Furthermore, in order to enable the entire part or a part of the light-sensitive element to be peeled off the image-receiving element as necessary, a release layer may be provided in any suitable position (such embodiments are described in JP-A-56-67840 and Canadian Patent 674,082).

Another peeless embodiment comprises a light-sensitive element as described above coated on a transparent support, a white reflective layer coated thereon and an image-receiving layer laminated thereon.

An embodiment in which an image-receiving element, a white reflective layer, a release layer and a light-sensitive element are laminated on the same support in such an arrangement that the light-sensitive element can be intentionally peeled off the image-receiving element is described in U.S. Pat. No. 3,730,718.

In an embodiment of film unit described in JP-A-63-226649, an image-receiving layer, a release layer, and a light-sensitive layer combined with a dye-releasing redox (DRR) compound are sequentially coated on a white reflective support. In this embodiment, an alkaline processing solution is spread over between a transparent cover sheet having a neutralizing function and the light-sensitive layer. After processing, the white reflective support and the image-receiving layer are peeled off the light-sensitive layer at the release layer. The present invention can also be applied to this embodiment.

On the other hand, the embodiment of film unit in which a light-sensitive element and an image-receiving element are separately coated on two supports can be roughly divided into two typical types, i.e., peel type and peeless type. In particular, a preferred embodiment of the peel type film unit comprises a light reflecting layer coated on the back surface of a support and at least one image-receiving layer coated on the opposite side of the support. A light-sensitive element is coated on a support comprising a light-shielding layer. In this arrangement, the light-sensitive layer-coated surface, which doesn't face the mordant layer-coated surface before exposure, is turned over and comes in contact with the image-receiving layer-coated surface after exposure (e.g., during development). Once transfer images are completed at the mordant layer, the light-sensitive element is readily peeled off the image-receiving element.

A preferred embodiment of the peeless type film unit comprises at least one mordant layer coated on a transparent support and a light-sensitive element coated on a transparent support or a support comprising a light-shielding layer, the light-sensitive layer-coated surface and the mordant layer-coated surface facing each other.

In the above-mentioned embodiments of color diffusion transfer mode, the film units are normally combined with pressure-rupturable containers containing an alkaline processing solution (processing element). In the peeless type film unit wherein an image-receiving element and a light-sensitive element are laminated on a support, this processing element is preferably positioned between a light-sensitive element and a cover sheet superimposed thereon. In the embodiment wherein a light-sensitive element and an image-receiving element are separately coated on two supports, this processing element is preferably positioned between the light-sensitive element and the image-receiving element at latest during development. The processing element preferably comprises a light-shielding agent (e.g., carbon black and a dye capable of changing color with the pH) and/or a white pigment (e.g., titanium oxide) depending on the embodiment of film unit. In a color diffusion transfer mode film unit, a neutralization timing mechanism comprising a combination of a neutralizing layer and a neutralization timing layer is preferably incorporated in a cover sheet, image-receiving element or light-sensitive element.

These film units are normally worked into a monosheet by means of masking material, rail material, excess solution trapping material or the like as described in JP-B-48-33697, JP-A-48-43317, JP-A-50-153628, JP-A-52-11027, and JP-A-56-48629.

In particular, as described in Research Disclosure No. 23026 (1983), slits can be effectively provided on film units to facilitate the release of the light-sensitive element after processing. The shape, depth and the like of the slits are selected depending on the physical properties of the white support.

The size of the film units can be arbitrarily selected. Besides the size of current commercial instant films, more compact film sizes or larger film sizes can be used.

In order to effect photographing with the above-described film units, it is necessary that the mirror image of the object be formed on these films. To this end, a mirror is needed.

This type of a camera is known in U.S. Pat. No. 3,447,437.

In the present invention, a light-sensitive layer is provided, comprising a silver halide emulsion layer combined with a dye providing compound.

(1) Dye Providing Compound

The dye providing compound to be used in the present invention is a nondiffusible compound which releases a diffusible dye (or dye precursor) in connection with a redox reaction or a compound which alters its diffusibility in connection with a redox reaction. The dye providing compound is described in *The Theory of the Photographic Process*, 4th ed. The dye providing compound can be represented by the following general formula (XII):

DYE-Y         (XII)

wherein DYE represents a dye or dye precursor; and Y represents a component which provides a compound different in diffusibility from said compound under an alkaline condition. By the function of Y, the dye providing compound can be roughly divided into two types of compounds, i.e., negative type compound which becomes diffusible at developed silver portions and positive type compound which becomes diffusible at undeveloped silver portions.

Specific examples of negative type Y groups include those which undergo oxidation and cleavage to release a diffusible dye upon development.

Specific examples of Y groups are described in U.S. Pat. Nos. 3,928,312, 3,993,638, 4,076,529, 4,152,153, 4,055,428, 4,053,312, 4,198,235, 4,179,291, 4,149,892, 3,844,785, 3,443,943, 3,751,406, 3,443,939, 3,443,940, 3,628,952, 3,980,479, 4,183,753, 4,142,891, 4,278,750, 4,139,379, 4,218,368, 3,421,964, 4,199,355, 4,199,354, 4,135,929, 4,336,322, and 4,139,389, JP-A-53-50736, JP-A-51-104343, JP-A-54-130122, JP-A-53-110827, JP-A-56-12642, JP-A-56-16131, JP-A-57-4043, JP-A-57-650, JP-A-57-20735, JP-A-53-69033, JP-A-54-130927, JP-A-56-164342, and JP-A-57-119345.

Particularly preferred examples of Y groups in negative type dye-releasing redox compounds include an N-substituted sulfamoyl group (substituents in the N-position are groups derived from aromatic hydrocarbon ring or hetero ring). Typical examples of Y groups will be set forth below, but the present invention should not be construed as being limited thereto.

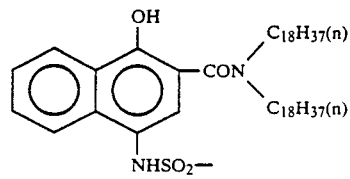

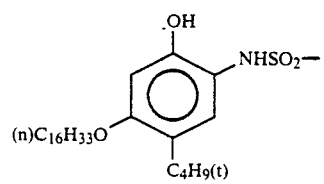

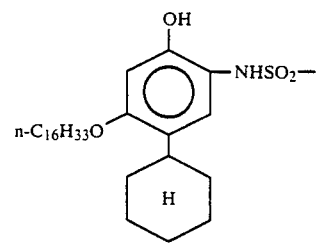

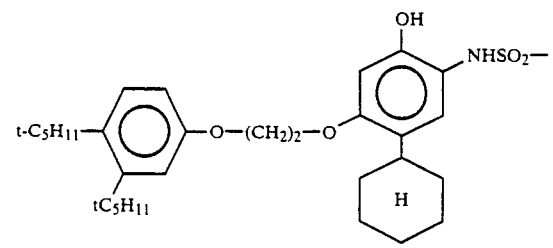

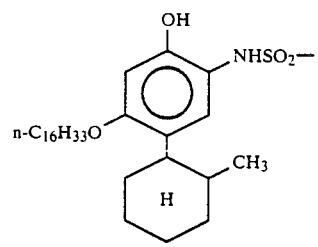

Positive type compounds as described above are described in *Angevante Chemi International Edition English*, 22, 191(1982).

Specific examples of positive type compounds include compounds which stay diffusible under an alkaline condition but undergo oxidation upon development to become nondiffusible (dye developing agent). Typical examples of Y groups effective for this type of compounds include those described in U.S. Pat. No. 2,983,609.

Another type of a dye providing compound is a compound which undergoes self-ring closure or the like under an alkaline condition to release a diffusible dye but undergoes oxidation upon development to substantially suspend the release of such a diffusible dye. Specific examples of Y groups having such a function are described in U.S. Pat. Nos. 3,980,479, 3,421,964 and 4,199,355, JP-A-53-69033 and JP-A-54-130927.

A further type of a dye providing compound is a compound which does not release any dye itself but undergoes reduction to release a dye. This type of a compound can be used in combination with an electron donor so that it reacts with portions of the electron donor left by the imagewise oxidation upon the imagewise development of silver to release a diffusible dye. Examples of atomic groups having such a function are described in U.S. Pat. Nos. 4,183,753, 4,142,891, 4,278,750, 4,139,379, 4,218,368, 4,278,750, 4,356,249 and 4,358,525, JP-A-53-110827, JP-A-54-130927, JP-A-56-164342, Kokai Giho 87-6199, and European Patent 220746A2.

Specific examples of such atomic groups will be set forth below, but the present invention should not be construed as being limited thereto.

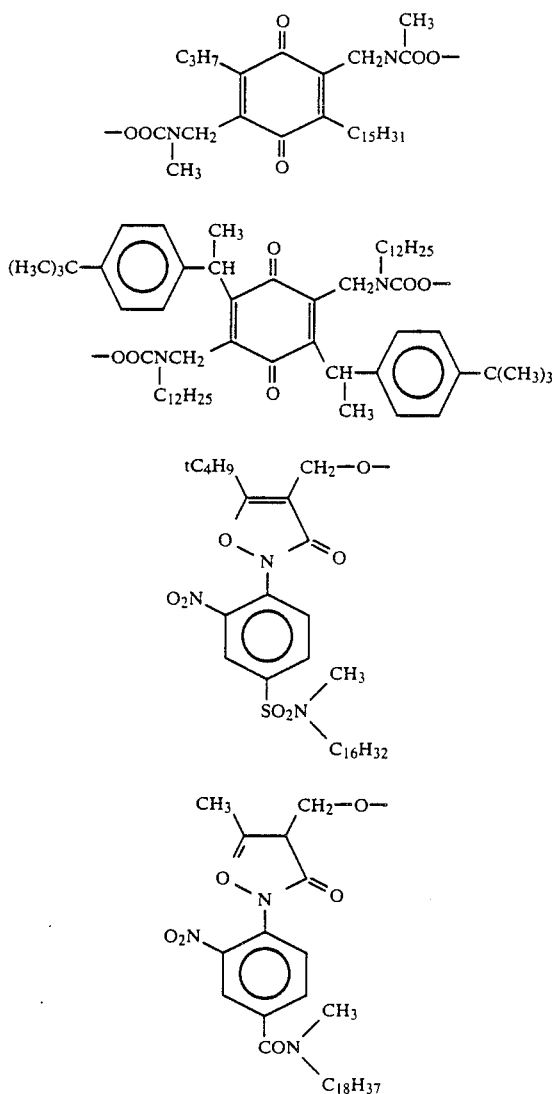

This type of a compound may be preferably used in combination with a nondiffusible electron donor (well known as ED compound) or its precursor. Examples of such an ED compound are described in U.S. Pat. Nos. 4,263,393 and 4,278,750, and JP-A-56-138736.

Specific examples of a still further type of a dye-forming substance which can be used in the present invention include the following compounds:

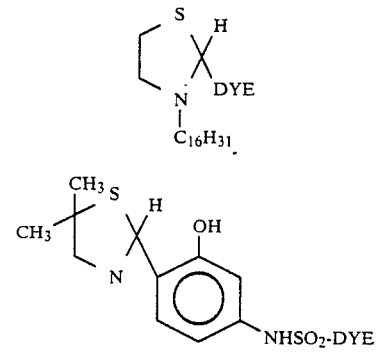

wherein DYE represents a dye or its precursor as defined above.

This type of a compound is further described in U.S. Pat. Nos. 3,719,489 and 4,098,783.

Specific examples of dyes represented by DYE in the above-described general formulae are described in the following references.

In particular, examples of yellow dyes represented by LYE are described in U.S. Pat. Nos. 3,597,200, 3,309,199, 4,013,633, 4,245,028, 4,156,609, 4,139,383, 4,195,992, 4,148,641, 4,148,643 and 4,336,322, JP-A-51-114930, JP-A-56-71072, and Research Disclosure, Nos. 17630 (1978) and 16475 (1977).

Examples of magenta dyes represented by DYE are described in U.S. Pat. Nos. 3,453,107, 3,544,545, 3,932,380, 3,931,144, 3,932,308, 3,954,476, 4,233,237, 4,255,509, 4,250,246, 4,142,891, 4,207,104 and 4,287,292, JP-A-52-106727, JP-A-53-23628, JP-A-55-36804, JP-A-56-73057, JP-A-56-71060, and JP-A-55-134.

Examples of cyan dyes represented by DYE are described in U.S. Pat. Nos. 3,482,972, 3,929,769, 4,013,635, 4,268,625, 4,171,220, 4,242,435, 4,142,891, 4,195,994, 4,147,544 and 4,148,642, British Patent 1,551,138, JP-A-54-99431, JP-A-52-8827, JP-A-53-47823, JP-A-53-143323, JP-A-54-99431, JP-A-56-71061, European Patents (EPC) 53,037 and 53,040, and Research Disclosure, Nos. 17630 (1978) and 16475 (1977).

(2) Silver Halide Emulsion

The silver halide emulsion to be used in the present invention may be either a negative type emulsion which forms latent images mainly on the surface of silver halide grains or an internal latent image type direct positive emulsion which forms latent images mainly inside the silver halide grains.

Examples of such an internal latent image type direct positive emulsion include a so-called "conversion type" emulsion prepared using a solubility difference between silver halides and a "core/shell type" emulsion prepared by a process which comprises converting at least light-sensitive sites in inner nucleus (cores) of silver halide grains by a shell of silver halide by doping the material with metallic ions or subjecting the material to chemical sensitization or subjecting the material to both the two treatments. These types of emulsions are described in U.S. Pat. Nos. 2,592,250, 3,206,313, 3,761,276, 3,935,014, 3,447,927, 2,497,875, 2,563,785, 3,551,662, 4,395,478 and 4,431,730, British Patent 1,027,146, and West German Patent 2,728,108.

If such an internal latent image type direct positive emulsion is used, its surface needs to be provided with fogged nucleus by using light or a nucleating agent after imagewise exposure.

Examples of such a nucleating agent include hydrazines as described in U.S. Pat. Nos. 2,563,785 and 2,588,982, hydrazides and hydrazones as described in U.S. Pat. No. 3,227,552, heterocyclic quaternary salt compounds as described in British Patent 1,283,835, JP-A-52-69613, and U.S. Pat. Nos. 3,615,615, 3,719,494, 3,734,738, 4,094,683 and 4,115,122, sensitizing dyes containing nucleating substituents in dye molecules as described in U.S. Pat. No. 3,718,470, thiourea bond type acylhydrazine compounds as described in U.S. Pat. Nos. 4,030,925, 4,031,127, 4,245,037, 4,255,511, 4,266,013 and 4,276,364, and British Patent 2,012,443, and acylhydrazine compounds containing thioamide rings or other heterocyclic groups such as triazole and tetrazole bonded thereto as adsorption groups as described in U.S. Pat. Nos. 4,080,270 and 4,278,748, and British patent 2,011,391B.

In the present invention, these negative type emulsion and internal latent image type direct positive emulsion may be used in combination with a spectral sensitizing dye. Specific examples of such a spectral sensitizing dye are described in JP-A-59-180550, JP-A-60-140335, *Research Disclosure*, No. 17029, and U.S. Pat. Nos. 1,846,300, 2,078,233, 2,089,129, 2,165,338, 2,231,658, 2,917,516, 3,352,857, 3,411,916, 2,295,276, 2,481,698, 2,688,545, 2,921,067, 3,282,933, 3,397,060, 3,660,103, 3,335,010, 3,352,680, 3,384,486, 3,623,881, 3,718,470, and 4,025,349.

(3) Structure of Light-Sensitive Layer

In the reproduction of natural colors by the subtractive process, a light-sensitive layer is used, comprising at least two combinations of an emulsion spectrally sensitized with the above described spectral sensitizing dye and the above described dye-forming substance which provides a dye having a selective spectral absorption in the same wavelength region. The emulsion and the dye-forming substance can be coated on each other as separate layers or in admixture as a single layer. If the dye-forming substance has an absorption in the spectral sensitivity region of the emulsion to be used in combination therewith as it is in the form cf coat, the two components are preferably coated as separate layers. If the dye-forming substance has been temporarily shifted to a short wavelength region in its absorption, it is preferably coated in admixture with the emulsion. In this case, the film thickness of the light-sensitive element can be reduced to reduce the time required for development. The emulsion layer may consist of a plurality of emulsion layers having different sensitivities. Alternatively, any suitable layer may be provided interposed between the emulsion layer and the dye-forming substance layer. For example, a nucleation accelerator-containing layer can be used as described in JP-A-60-173541. As described in JP-B-60-15267, a partition layer can be provided to improve the color image density. Furthermore, a reflective layer can be provided to improve the sensitivity of the light-sensitive element as described in JP-A-60-91354.

In a preferred multi-layer structure, a combination unit of blue-sensitive emulsions, a combination unit of green-sensitive emulsion and a combination unit of red-sensitive emulsions are arranged in this order from the exposure side.

Any suitable layer can be optionally provided between emulsion units. In particular, an interlayer can be provided to prevent the development of one emulsion unit from affecting another.

If a nondiffusible dye-forming substance is used in combination with a developing agent, a nondiffusible reducing agent is preferably incorporated in the interlayer to prevent the diffusion of an oxidation product of the developing agent. Specific examples of such a nondiffusible reducing agent include hydroquinone, sulfonamide phenol, and sulfonamide naphthol. More particularly, these nondiffusible reducing agents are described in JP-B-50-21249, JP-B-50-23813, JP-A-49-106329, JP-A-49-129535, JP-A-57-24941, JP-A-58-21249, U.S. Pat. Nos. 2,336,327, 2,360,290, 2,403,721, 2,544,640, 2,732,300, 2,782,659, 2,937,086, 3,637,393 and 3,700,453, and British Patent 557,750. Processes for the dispersion of these nondiffusible reducing agents are described in JP-A-60-238831 and JP-B-60-18978.

In the present invention, an anti-irradiation layer, a partition layer, a protective layer and the like can be provided as necessary.

As a support to be incorporated in the present color light-sensitive material there can be normally used paper or synthetic high-molecular weight material (film). Specific examples of such a support include polyethylene terephthalate, polycarbonate, polyvinyl chloride, polystyrene, polypropylene, polyimide, celluloses (e.g., triacetyl cellulose), compounds obtained by incorporating pigments such as titanium oxide in these films, synthetic paper prepared from polypropylene by film process, mixed paper prepared from a synthetic resin pulp such as polyethylene and a natural pulp, Yankee paper, baryta paper, coated paper (particularly cast coat paper), metal, cloth, and glass.

These support materials can be used singly. Alternatively, these support materials can be laminated with a synthetic polymer such as polyethylene on one side or both sides thereof.

In addition, support materials as described in JP-A-62-253159, pp. 29–31, can be used.

These support materials can be coated with a hydrophilic binder, a semiconducting metallic oxide such as alumina sol and tin oxide, carbon black, or other antistatic agents.

In the present invention, a light-shielding layer can be provided by completely screening the light-sensitive layer from light from outside during development for the purpose of enabling processing in daylight. In particular, a layer containing a light-shielding agent may be coated on the back surface of the support. Such a layer may be provided between the emulsion layer and the support. Alternatively, such a layer may be provided in the support. As such a light-shielding material there can be used any such a material. Carbon black can be preferably used.

As a binder in which such a light-shielding agent is incorporated there can be used any binder capable of dispersing carbon black therein. Gelatin can be preferably used as such a binder.

In the present invention, between an emulsion layer combined with a dye-forming substance and a dye-receiving layer can be provided a release layer which enables the emulsion layer to be stripped after processing. This release layer must keep the emulsion layer and the dye-receiving layer in contact with each other as they are unprocessed but must facilitate the release of the emulsion layer after processing. As such materials there can be used those described in JP-A-47-8237, JP-A-59-220727, JP-A-59-229555, JP-A-49-4653, JP-A-49-4334, JP-A-56-65133, JP-A-45-24075, and U.S. Pat. Nos. 3,220,835, 4,359,518, 3,227,550, 2,759,825, 4,401,746 and 4,366,227. One of these specific examples is a water-soluble (or alkali-soluble) cellulose derivative. Examples of such a water-soluble (or alkali-soluble) cellulose derivative include hydroxy cellulose, cellulose acetate phthalate, plasticized methyl cellulose, ethyl cellulose, cellulose nitrate, and carboxymethyl cellulose. Other examples are various natural polymers such as alginic acid, pectin, and gum arabic. Various modified gelatins such as acetylated gelatin and phthalated gelatin can also be used. Further examples of release layer materials include water-soluble synthetic polymers such as polyvinyl alcohol, polyacrylate, polymethyl methacrylate, butyl methacrylate, and copolymers thereof.

The release layer may be a singly layer or may consist of a plurality of layers. Examples of these release layers are described in JP-A-59-220727 and JP-A-60-60642.

The image-receiving layer to be used in the present invention comprises a mordant in a hydrophilic colloid. The image-receiving layer may have a single layer structure or a multi-layer structure in which mordants having different mordanting capabilities are coated on each other. These structures are described in detail in JP-A-61-252551. As such a mordant there can be preferably used a polymer mordant.

Examples of polymer mordants to be used in the present invention include polymers containing secondary or tertiary amino groups, polymers containing nitrogen-containing heterocyclic portions, and polymers containing quaternary cation groups. These polymers each contains a molecular weight of 5,000 or more, particularly 10,000 or more.

Specific examples of such polymer mordants include vinylpyridine polymers and vinylpyridinium cation polymers as described in U.S. Pat. Nos. 2,548,564, 2,484,430, 3,148,061 and 3,756,814, vinylimidazolium cation polymers as disclosed in U.S. Pat. No. 4,124,386, polymer mordants crosslinkable with gelatin or the like as disclosed in U.S. Pat. Nos. 3,625,694, 3,859,096 and 4,128,538, and British Patent 1,277,453, aqueous sol type mordants as disclosed in U.S. Pat. Nos. 3,958,995, 2,721,852 and 2,798,063, JP-A-54-115228, JP-A-54-145529, JP-A-54-126027, JP-A-54-155835, and JP-A-56-17352, water-insoluble mordants as disclosed in U.S. Pat. No. 3,898,088, reactive mordants capable of being covalently bonded to dyes as disclosed in U.S. Pat. Nos. 4,168,976 and 4,201,840, and mordants as disclosed in U.S. Pat. Nos. 3,709,690, 3,788,855, 3,642,482, 3,488,706, 3,557,066, 3,271,147 and 3,271,148, JP-A-53-30328, JP-A-52-155528, JP-A-53-125, JP-A-53-1024, JP-A-53-107835, and British Patent 2,064,802.

Other examples of mordants which can be used in the present invention include those described in U.S. Pat. Nos. 2,675,316 and 2,882,156.

In the present invention, a cover sheet, a layer adjacent to the image-receiving layer or the like can be provided with a system for neutralizing the pH value of an alkaline processing solution. A neutralizing system can be accomplished by providing a neutralizing layer or neutralization timing layer. This timing layer is positioned between the processing solution and the neutralizing layer in a positional relationship such that the alkaline processing solution reaches the neutralizing layer via the timing layer. In this mechanism, the pH value is kept at a high value for some period of time, and then suddenly falls (this pH drop is called "inversed S-letter type" pH drop process). This mechanism is preferably characterized in that the pH value falls to 10.5 or less. The period over which the pH value is kept at a high value is adjusted by composition and coated amount of the neutralization timing layer.

Examples of such polymers include copolymers comprising one or more combinations of ethylenically unsaturated monomers copolymerizable with ethylenically unsaturated monocarboxylic or dicarboxylic acids (e.g., acrylic acid, methacrylic acid, itaconic acid), polymers as described in JP-A-59-202463, and polymers as described in U.S. Pat. Nos. 4,297,431, 4,288,523, 4,201,587 and 4,229,516, JP-A-55-121438, JP-A-56-166212, JP-A-55-41490, JP-A-55-54341, JP-A-56-102852, JP-A-57-41644, JP-A-57-173834, JP-A-57-179841, West German Patent OLS No. 2,910,271, European Patent 31957A1, and *Research Disclosure,* No. 18452. Examples of ethylenically unsaturated monomers include ethylene, propylene, 1-butene, isobutene, styrene, chloromethylstyrene, hydroxymethylstyrene, sodium vinylbenzenesulfonate, sodium vinylbenzylsulfonate, N,N,N-trimethyl-N-vinylbenzylammonium chloride, N,N-dimethyl-N-benzyl-N-vinylbenzylammonium chloride, α-methylstyrene, vinyltoluene, 4-vinylpyridine, 2-vinylpyridine, benzylvinylpyridinium chloride, N-vinyl acetamide, N-vinylpyrrolidone, 1-vinyl-2-methylimidazole, monoethylenically unsaturated esters of fatty acids (e.g., vinyl acetate, allyl acetate), maleic anhydride, ethylenically unsaturated esters of monocarboxylic or dicarboxylic acids (e.g., n-butyl acrylate, n-hexyl acrylate, hydroxyethyl acrylate, cyanoethyl acrylate, N,N-diethylaminoethyl acrylate, methyl methacrylate, n-butyl methacrylate, benzyl methacrylate, hydroxyethyl methacrylate, chloroethyl methacrylate, methoxyethyl methacrylate, N,N-diethylaminoethyl methacrylate, N,N,N-triethyl-N-methacryloyloxyethylammonium-p-toluenesulfonate, N,N-diethyl-N-methyl-N-methacryloyloxyethylammonium-p-toluenesulfonate, dimethyl itaconate, monobenzyl maleate), and ethylenically unsaturated amides of monocarboxylic or dicarboxylic acids (e.g., acrylamide, N,N-dimethylacrylamide, N-methylolacrylamide, N-(N,N-dimethylaminopropyl) acrylamide, N,N,N-trimethyl-N-(N-acryloylpropyl)ammonium-p-toluenesulfonate, sodium 2-acrylamido-2-methylpropanesulfonate, acryloylmorpholine, methacrylamide, N,N-dimethyl-N'-acryloylpropanediamine propionate betaine, N,N-dimethyl-N'-methacryloylpropanediamine acetate betaine).

The neutralization timing layer may have a single layer structure or a multi-layer structure.

In a timing layer comprising these materials can be incorporated development inhibitors and/or precursors thereof as disclosed in U.S. Pat. No. 4,009,029, West German Patent OLS Nos. 2,913,164 and 3,014,672, JP-A-54-155837, and JP-A-55-138745, hydroquinone precursors as disclosed in U.S. Pat. No. 4,201,578, or other photographically useful additives or precursors thereof.

As an acidic substance to be incorporated in the neutralizing layer there can be used any known acidic substance. Such an acidic substance is not specifically limited. Preferred examples of such an acidic substance include those containing an acidic group having a pKa of 9 or less (or precursor group which undergoes hydrolysis to provide such an acidic group). Further preferred examples of such an acidic substance include higher fatty acids as described in U.S. Pat. No. 2,983,606 such as oleic acid, polymers of acrylic acid, methacrylic acid or maleic acid and partial esters or acid anhydrides thereof as disclosed in U.S. Pat. No.

3,362,819, copolymers of acrylic acid and acrylic ester as described in French Patent 2,290,699, and latex type acidic polymers as disclosed in U.S. Pat. No. 4,139,383 and *Research Disclosure* No. 16102 (1977).

Other examples of acidic substances which can be used in the present invention include those described in U.S. Pat. No. 4,088,493, JP-A-52-153739, JP-A-53-1023, JP-A-53-4540, JP-A-53-4541, and JP-A-53-4542.

Specific examples of acidic polymers include copolymers of vinyl monomer such as ethylene, vinyl acetate and vinylmethyl ether and maleic anhydride, or n-butyl esters thereof, copolymers of butyl acrylate and acrylic acid, and cellulose acetate hydrodiene phthalate.

These polymer acids can be used in admixture with hydrophilic polymers. Examples of such hydrophilic polymers include polyacrylamide, polymethylpyrrolidone, polyvinyl alcohol (including partially saponified compounds), carboxymethyl cellulose, hydroxymethyl cellulose, hydroxyethyl cellulose, and polymethylvinyl ether. Particularly preferred among these polymers are polyvinyl alcohol.

The coated amount of the polymer acid depends on the amount of an alkali spread over the light-sensitive element. The ratio of the equivalent amount of polymer acid to alkali per unit area is preferably in the range of 0.9 to 2.0, more preferably 1.0 to 1.3. If the amount of the polymer acid is too small, it is disadvantageous in that the hue of transferred dye changes or colored background portions suffer from stain. On the contrary, if the amount of the polymer acid is too large, it is disadvantageous in that the hue of transferred dye changes or the light-resistance of the light-sensitive material deteriorates. If the amount of hydrophilic polymer to be used with the polymer acid is too small or large, it deteriorates the photographic properties of the light-sensitive material. The weight ratio of the hydrophilic polymer to the polymer acid is in the range of 0.1 to 10, preferably 0.3 to 3.0.

In the layer having a neutralizing function can be incorporated additives for various purposes. For example, in order to harden the neutralizing layer, a film hardener well known in the art can be used. In order to eliminate the brittleness of the film, a polyhydric hydroxyl compound such as polyethylene glycol, polypropylene glycol and glycerin can be used. In addition, an oxidation inhibitor, a dye or the like can be used as necessary.

The processing composition to be used in the wet processing of the present color light-sensitive material is adapted to be uniformly spread over the light-sensitive material which has been exposed so that the light-sensitive layer is completely shielded from light from the outside and is developed with a component contained therein. To this end, the processing composition contains as essential components an alkali, thickening agent, developing agent and light-shielding agent. The processing composition also contains a development accelerator or inhibitor for adjusting development, an antioxidant for inhibiting deterioration of developing agent, a white pigment for enabling preview of imagewise-produced dyes from the cover sheet side, or the like.

The alkali needs to have an alkalinity enough to adjust the pH value of the solution at 12 to 14. Examples of such an alkali include hydroxides of alkali metals (e.g., sodium hydroxide, potassium hydroxide, lithium hydroxide), phosphates of alkali metals (e.g., potassium phosphate), guanidines, and hydroxides of quaternary amines (e.g., tetramethylammonium hydroxide). Particularly preferred among these alkalis are potassium hydroxide and sodium hydroxide.

The thickening agent is required to uniformly spread the processing solution over the light-sensitive material. The thickening agent is also required to keep the light-sensitive layer and the cover sheet in contact with each other when the light-sensitive layer which has been used is peeled off with the cover sheet. For example, polyvinyl alcohol, hydroxyethyl cellulose, or salts of alkali metals with carboxymethyl cellulose can be used as the thickening agent. Preferred among these thickening agents are hydroxyethyl cellulose and sodium carboxymethyl cellulose.

As the light-shielding agent there can be used any dye or pigment or a combination thereof so long as it doesn't diffuse into the dye-receiving layer and cause stain therein. Carbon black is preferably used as light-shielding agent.

The amount of the light-shielding agent to be incorporated needs to be enough to shield the light-sensitive element from strong light from the outside during processing and is in the range of 30 to 200 g, preferably 40 to 120 g per kg of processing solution.

As such a white pigment there can be used any white pigment so long as it does not give an adverse effect. For example, an inorganic titanium white can be used. In addition, hollow polymer beads (e.g., Rohm and Hass' OP-84 ®) can be used.

The content of the white pigment is in the range of 50 to 400 g, preferably 100 to 300 g per kg of processing solution.

As a suitable developing agent there can be used any developing agent so long as it cross-oxidizes a dye-forming substance and doesn't substantially cause stain even when oxidized. These developing agents can be used singly or in combination or can be used in the form of precursors. These developing agents can be incorporated in any suitable layer in the light-sensitive element or in an alkaline processing solution. Specific examples of such developing agents include aminophenols and pyrazolidinones. Particularly preferred among these developing agents are pyrazolidinones which cause little stain.

Examples of such pyrazolidinones include 1-phenyl-3-pyrazolidinone, 1-p-tolyl-4,4-dihydroxymethyl-3-pyrazolidinone, 1-(3'-methylpenyl)-4-methyl-4-hydroxymethyl-3-pyrazolidinone, 1-phenyl-4-methyl-4-hydroxymethyl-3-pyrazolidinone, and 1-p-tolyl-4-methyl-4-hydroxymethyl-3-pyrazolidinone.

If these developing agents are applied to a heat developable light-sensitive material, they are preferably incorporated in the light-sensitive material.

The present invention will be further described in the following examples, but the present invention should not be construed as being limited thereto. In particular, various formats and layer structures are possible. The present invention can be effectively applied and provide significant effects so long as it has a structure having a color stain inhibiting layer.

EXAMPLE 1

Image-Receiving Light-sensitive Sheet

A carbon black layer (containing 3.0 g/m$^2$ of carbon black and 4.5 g/m$^2$ of gelatin) and a titanium oxide layer (containing 3.0 g/m$^2$ of titanium oxide and 1.0 g/m$^2$ of gelatin) were successively coated on the back side of a polyethylene terephthalate support containing a titanium oxide white pigment as light-shielding layers.

The following layers were sequently coated on the side of the support opposite to the light-shielding layers to prepare an image-receiving light-sensitive sheet.

(1) Image-receiving layer containing 3 g/m² of a polymer latex mordant of the following formula and 3 g/m² of gelatin

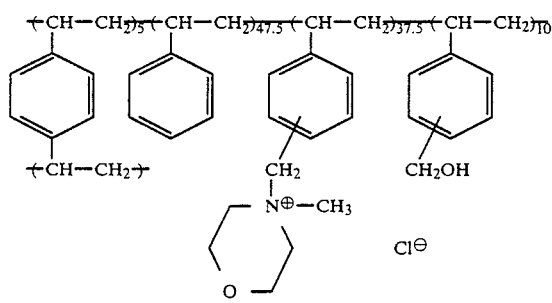

(2) 1st release layer comprising 0.1 g/m² of the following compound:

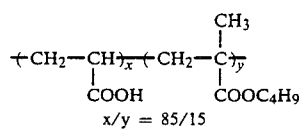

x/y = 85/15

(3) 2nd release layer comprising 0.7 g/m² of cellulose acetate having an acetylation degree of 51%

(4) Layer containing 1 g/m² of ethyl acrylate latex and 2.5 g/m² of gelatin (5) Layer containing 0.44 g/m² of a cyan dye-releasing redox compound of the following formula, 0.09 g/m² of tricyclohexyl phosphate, 0.008 g/m² of 2,5-di-t-pentadecylhydroquinone, 0.05 g/m² of carbon black, and 0.8 g/m² of gelatin

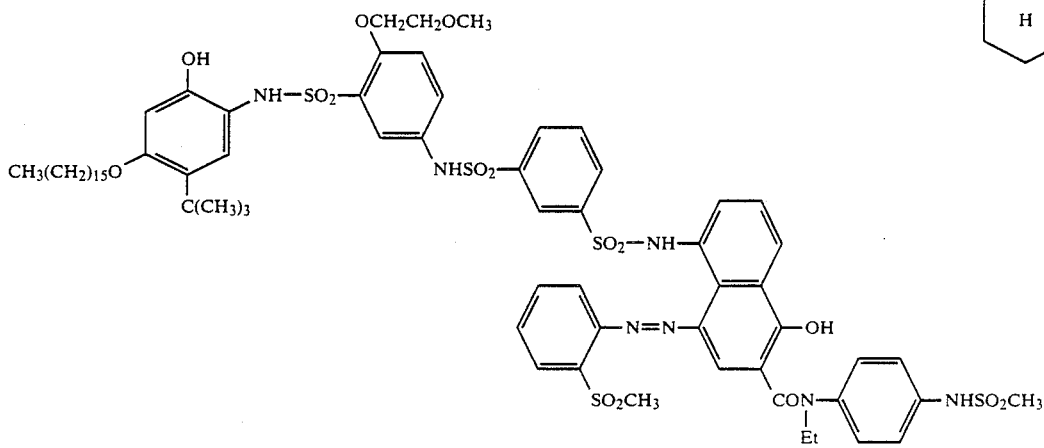

(6) Light reflecting layer containing 2 g/m² of titanium oxide and 0.5 g/m² of gelatin (7) Low sensitivity red-sensitive emulsion layer containing an internal latent image type direct positive emulsion of octahedral silver bromide grains having a size of 1.0 μm (in an amount of 0.15 g/m² as calculated in terms of amount of silver), a red-sensitive sensitizing dye, 0.4 g/m² of gelatin, 1.1 μg/m² of a nucleating agent (NA) of the following formula, and 0.02 g/m² of sodium salt of 2-sulfo-5-n-pentadecylhydroquinone

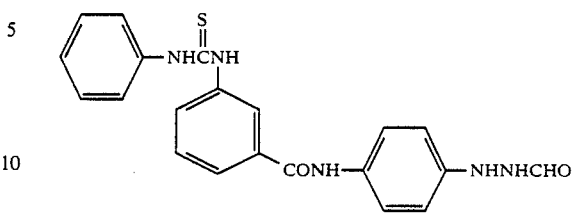

(8) High sensitivity red-sensitive emulsion layer containing an internal latent image type direct positive emulsion of octahedral silver bromide grains having a size of 1.6 μm (in an amount of 0.5 g/m² as calculated in terms of amount of silver), a red-sensitive sensitizing dye, 0.8 g/m² of gelatin, 3.0 μg/m² of the same nucleating agent (NA) as in layer (7), and 0.04 g/m² of sodium salt of 2-sulfo-5-n-pentadecylhydroquinone (9) Color stain inhibiting layer shown in Table 1.

(10) Layer containing 0.3 g/m² of gelatin

(11) Layer containing 0.15 g/m² of a magenta dye-releasing redox compound of the following formula, 0.1 g/m² of tricyclohexyl phosphate, 0.009 g/m² of 2,5-di-t-pentadecylhydroquinone, and 0.9 g/m² of gelatin

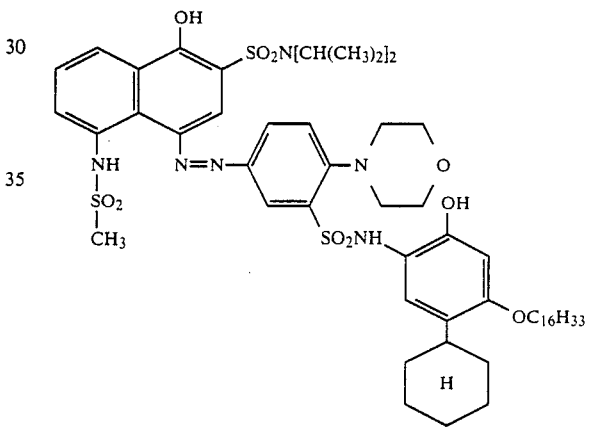

(12) Light reflecting layer containing 1 g/m² of titanium oxide and 0.25 g/m² of gelatin

(13) Low sensitivity green-sensitive emulsion layer containing an internal latent image type direct positive emulsion of octahedral silver bromide grains having a size of 1.0 μm (in an amount of 0.12 g/m² as calculated in terms of amount of silver), a green-sensitive sensitizing dye, 0.25 g/m² of gelatin, 1.1 μg/m² of the same nucleating agent (NA) as in layer (7), and 0.02 g/m² of sodium salt of 2-sulfo-5-n-pentadecylhydroquinone

(14) High sensitivity green-sensitive emulsion layer containing an internal latent image type direct positive emulsion of octahedral silver bromide grains having a size of 1.6 μm (in an amount of 0.35 g/m² as calculated in terms of amount of silver), a green-sensitive sensitizing dye, 0.7 g/m² of gelatin, 1.7 μg/m² of the same nucleating agent (NA) as in layer (7), and 0.04 g/m² of sodium salt of 2-sulfo-5-n-pentadecylhydroquinone

(15) The same color stain inhibiting layer as layer (9) having the composition set forth in Table 1

(16) Layer containing 0.53 g/m² of a yellow dye-releasing redox compound of the following formula, 0.13 g/m² of tricyclohexyl phosphate, 0.014 g/m² of 2,5-di-t-pentadecylhydroquinone, and 0.7 g/m² of gelatin

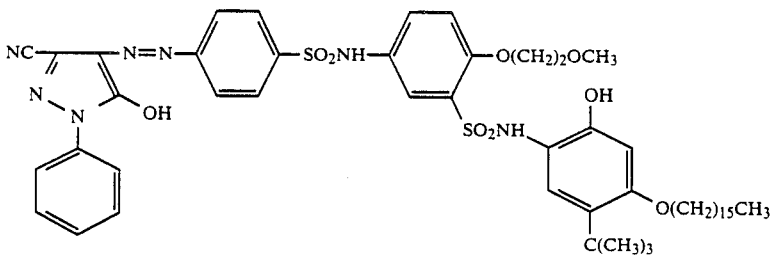

(18) Light reflecting layer containing 0.7 g/m² of titanium oxide and 0.18 g/m² of gelatin

(19) Low sensitivity blue-sensitive emulsion layer containing an internal latent image type direct positive emulsion of octahedral silver bromide grains having a size of 1.1 μm (in an amount of 0.25 g/m² as calculated in terms of amount of silver), a blue-sensitive sensitizing dye, 0.4 g/m² of gelatin, 2 μg/m² of the same nucleating agent (NA) as in layer (7), and 0.045 g/m² of sodium salt of 2-sulfo-5-n-pentadecylhydroquinone

(20) High sensitivity blue-sensitive emulsion layer containing an internal latent image type direct positive emulsion of octahedral silver bromide grains having a size of 1.7 μm (in an amount of 0.42 g/m² as calculated in terms of amount of silver), a blue-sensitive sensitizing dye, 0.45 g/m² of gelatin, 3.3 μg/m² of the same nucleating agent (NA) as in layer (7), and 0.025 g/m² of sodium salt of 2-sulfo-5-n-pentadecylhydroquinone

(21) Ultraviolet-absorbing layer containing 4×10⁻⁴ mol/m² of the following ultraviolet absorbents each and 0.5 g/m² of gelatin

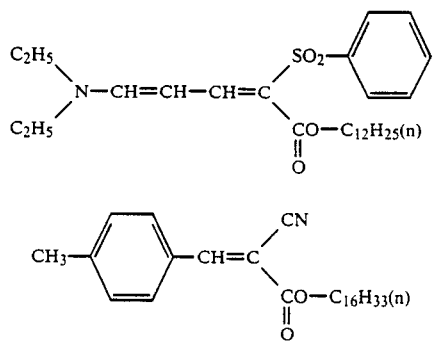

(22) Protective layer containing a matting agent and 0.5 g/m² of gelatin

Cover Sheet

The following layers were sequentially coated on a gelatin-coated polyethylene terephthalate support containing a light piping inhibiting dye to prepare a cover sheet.

(a) 10.4 g/m² of an acrylic acid-butyl acrylate (molar ratio: 8:2) copolymer having an average molecular weight of 50,000 and 0.1 g/m² of 1,4-bis(2,3-epoxypropoxy)butane (b) Neutralization timing layer containing 4 g/m² of a polymer of the following chemical structure:

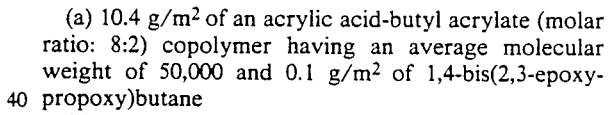

(c) Layer comprising 1.0 g/m² of gelatin and 1.0 g/m² of a polymer of the following chemical structure:

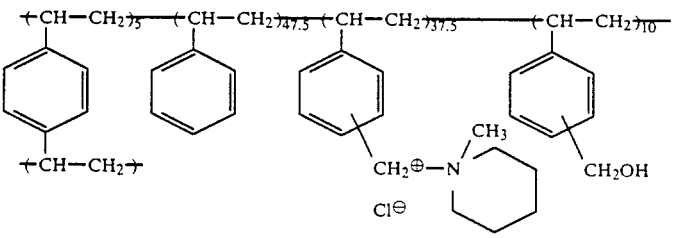

| Processing Solution | |
| --- | --- |
| 1-p-Tolyl-4-hydroxymethyl-4-methyl-3-pyrazolidinone | 10 g |
| 1-Phenyl-4-hydroxymethyl- | 4 g |

-continued

| Processing Solution | |
|---|---|
| 4-methyl-3-pyrazolidinone | |
| 5-Methylbenzotriazole | 1.2 g |
| Benzotriazole | 6 g |
| Potassium sulfite | 8 g |
| Carboxymethyl cellulose | 45 g |
| Potassium hydroxide | 64 g |
| 1,4-Cyclohexanedimethanol | 4.5 g |
| Carbon black | 150 g |
| Water to make | 1 kg |

These film units were then exposed from the cover sheet side to light through a grey wedge. The processing solution was then spread over the light-sensitive element to a thickness of 70 μm at a temperature of 25° C. by means of an extrusion member so that the light-sensitive material specimens were developed. These film units were peeled off 90 seconds, 120 seconds, 150 seconds, 240 seconds, 10 minutes and 60 minutes after the spreading of the processing solution. Percentage image completion was determined for each peel time. Percentage image completion is represented in yellow image formation density relative to that determined 60 minutes after the spreading of the processing solution ($B_0$) as 100.

On the other hand, the release characteristics were examined on the specimens which had not been processed (i.e., dry specimen) and the specimens which had been processed (i.e., wet specimen). In the examination of the release characteristics of the dry specimens, cuts were provided on the image-receiving light-sensitive sheet by means of a cutter knife. A cellophane tape was then put on the light-sensitive layer side (protective layer side). After the cellophane tape was peeled off, an examination was made to check how many pieces had been peeled off in each layer. It is necessary that all the pieces be peeled off from the release layer (i.e., between layer (2) and layer (3)).

In the examination of the release characteristics of the wet specimens, the cover sheet and the light-sensitive sheet were peeled off each other 60 minutes after the spreading of the processing solution. At this point, an examination was made to check how many pieces had been peeled off in each layer. It is similarly necessary that all the pieces be peeled off from the release layer (i.e., between layer (2) and layer (3)).

TABLE 1

| Light-Sensitive Sheet | Composition of Layer (9) and Layer (15) Coated amount per layer (g/m²) | | | Image completion | | | Dry peel characteristics | | Wet Peel characteristics | | Remarks |
|---|---|---|---|---|---|---|---|---|---|---|---|
| | Hydroquinone* | Coexisting Compound | Gelatin | $D_{max}^B$ 90 sec. | 60 min. | % Image completion | Main peeling position | Proportion of peel between Layer (2) and Layer (3) (%) | Main peeling position | Proportion of peel between Layer (2) and Layer (3) | |
| 1 | Hydroquinone A 0.66 | Polymer A 0.33 | 0.27 | 1.51 | 2.3 | 66 | 1* | 7 | 1* | 75 | Comparative |
| 2 | Hydroquinone A 0.66 | Polymer A 0.33 | 1.2 | 1.23 | 2.32 | 53 | 2* | 80 | 2* | 91 | Comparative |
| 3 | Hydroquinone A 0.66 | — | 0.27 | 1.46 | 2.18 | 68 | 1* | 15 | 1* | 85 | Comparative |
| 4 | Polymer 3 0.295 | — | 0.27 | 1.81 | 2.31 | 78 | 2* | 100 | 2* | 100 | Present Invention |
| 5 | Polymer 4 0.275 | — | 0.27 | 1.83 | 2.28 | 80 | 2* | 100 | 2* | 100 | Present Invention |
| 6 | Polymer 6 0.30 | — | 0.27 | 1.79 | 2.31 | 77 | 2* | 100 | 2* | 100 | Present Invention |
| 7 | Polymer 12 0.33 | — | 0.27 | 1.85 | 2.33 | 79 | 2* | 100 | 2* | 100 | Present Invention |
| 8 | Polymer 25 0.62 | — | 0.27 | 1.83 | 2.30 | 80 | 2* | 100 | 2* | 100 | Present Invention |
| 9 | Polymer 101 0.43 | — | 0.27 | 1.78 | 2.31 | 77 | 2* | 100 | 2* | 100 | Present Invention |
| 10 | Polymer 102 0.37 | — | 0.27 | 1.73 | 2.33 | 74 | 2* | 100 | 2* | 100 | Present Invention |
| 11 | Polymer 103 0.30 | — | 0.27 | 1.81 | 2.30 | 79 | 2* | 100 | 2* | 100 | Present Invention |
| 12 | Polymer 104 0.35 | — | 0.27 | 1.75 | 2.35 | 74 | 2* | 100 | 2* | 100 | Present Invention |
| 13 | Polymer 203 0.27 | — | 0.27 | 1.81 | 2.31 | 78 | 2* | 100 | 2* | 100 | Present Invention |
| 14 | Polymer 204 0.30 | — | 0.27 | 1.83 | 2.28 | 80 | 2* | 100 | 2* | 100 | Present Invention |
| 15 | Polymer 205 0.37 | — | 0.27 | 1.79 | 2.31 | 77 | 2* | 100 | 2* | 100 | Present Invention |
| 16 | Polymer 302 0.36 | — | 0.27 | 1.82 | 2.31 | 79 | 2* | 100 | 2* | 100 | Present Invention |
| 17 | Polymer 308 0.25 | — | 0.27 | 1.89 | 2.28 | 83 | 2* | 100 | 2* | 100 | Present Invention |
| 18 | Polymer 313 0.40 | — | 0.27 | 1.73 | 2.31 | 75 | 2* | 100 | 2* | 100 | Present Invention |

*The coated amount of hydroquinones is the same equivalent to redox.
*1: Peeled off at layer (9) and layer (15)
*2: Peeled off betwen layer (2) and layer (3)

Hydroquinone A

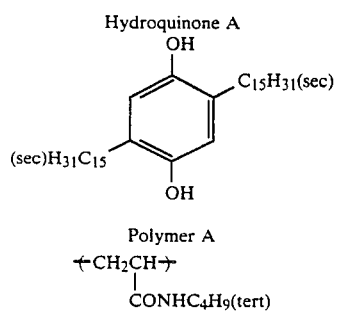

Polymer A

+CH₂CH+
  |
  CONHC₄H₉(tert)

Average molecular weight: 50,000

Table 1 shows that the light-sensitive sheets comprising the present hydroquinone compounds are strong films which are not subject to peeling at an interlayer (color stain inhibiting layer) regardless of whether they are dry or wet.

Furthermore, the thickness of the coat film thus prepared can be thinner than that of the conventional one, providing an excellent effect of improving the transfer speed (image completion speed). It is a surprising fact that the present specimens can accomplish strong films which are stronger and higher in transfer than the conventional color stain inhibiting layers.

Any specimen can accomplish excellent color separation without color stain.

EXAMPLE 2

Integrated laminated color diffusion transfer light-sensitive sheets and cover sheets were prepared as follows:

Light-Sensitive Sheet

Light-sensitive sheets 19 to 25 were prepared by coating the following components on a transparent polyethylene terephthalate support.

(1) Image-receiving layer containing 3.0 g/m² of copoly[styrene-N-vinylbenzyl-N-methylpiperidinium chloride] and 3.0 g/m² of gelatin (2) White reflective layer containing 20 g/m² of titanium dioxide and 2.0 g/m² of gelatin (3) Light-shielding layer containing 2.0 g/m² of carbon black and 1.5 g/m² of gelatin (4) Layer containing 0.44 g/m² of a cyan dye-releasing redox compound of the following formula, 0.09 g/m² of tricyclohexyl phosphate, 0.008 g/m² of 2,5-di-t-pentadecylhydroquinone, and 0.8 g/m² of gelatin

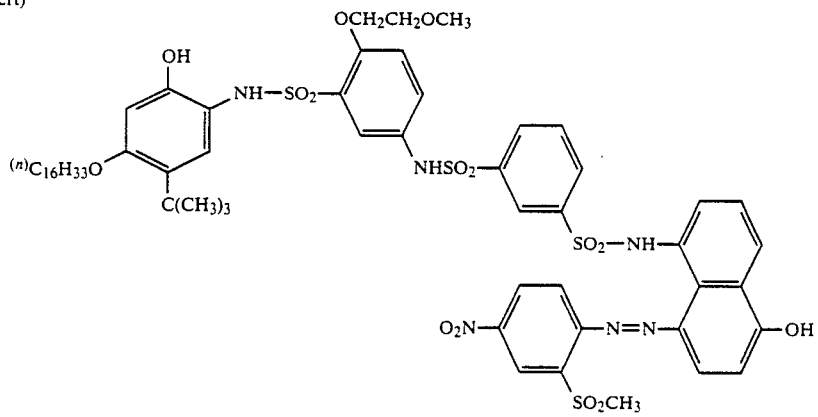

(5) Red-sensitive emulsion layer containing a red-sensitive internal latent image type direct positive emulsion of silver bromide (in an amount of 1.03 g/m² as calculated in terms of amount of silver), 1.2 g/m² of gelatin, 0.04 mg/m² of a nucleating agent of the following formula, and 0.13 g/m² of sodium salt of 2-sulfo-5-n-pentadecylhydroquinone

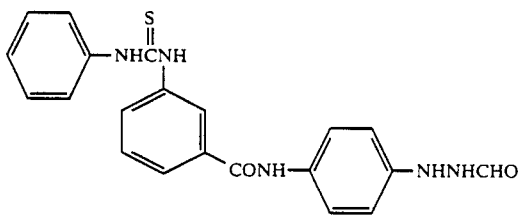

(6) Color stain inhibiting layer having the composition as set forth in Table 2

(7) Layer containing 0.3 g/m² of a magenta dye-releasing redox compound of the following formula, 0.08 g/m² of tricyclohexyl phosphate, 0.009 g/m² of 2,5-di-t-pentadecylhydroquinone, and 0.5 g/m² of gelatin

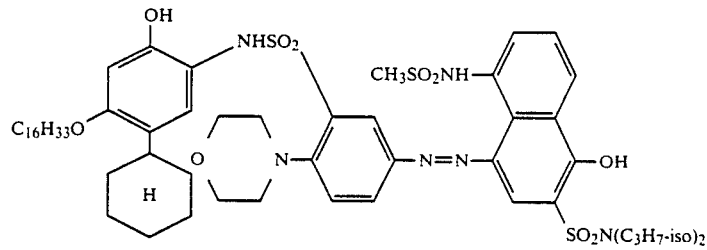

(8) Green-sensitive emulsion layer containing a green-sensitive internal latent image type direct positive emulsion of silver bromide (in an amount of 0.82 g/m² as calculated in terms of amount of silver), 0.9 g/m² of gelatin, 0.03 mg/m² of a nucleating agent as used in layer (5), and 0.08 g/m² of sodium salt of 2-sulfo-5-n-pentadecylhydroquinone (9) The same layer as layer (6)

(10) Layer containing 0.53 g/m² of a yellow dye-releasing redox compound of the following formula, 0.13 g/m² of tricyclohexyl phosphate, 0.014 g/m² of 2,5-di-t-pentadecylhydroquinone, and 0.7 g/m² of gelatin mer having an average molecular weight of 50,000 and 0.2 g/m² of 1,4-bis(2,3-epoxypropoxy)butane (2') 2nd timing layer containing 7.5 g/m² of cellulose acetate having an acetylation degree of 51.0% and a methylvinyl ether- monomethyl maleate alternating copolymer in a weight proportion of 95/5

(3') Auxiliary neutralizing layer containing 1.05 g/m² of a methylvinyl ether-maleic anhydride alternating copolymer, and 0.98 mmol/m² of 5-(2-cyano-1-methylthio)-1-phenyltetrazole

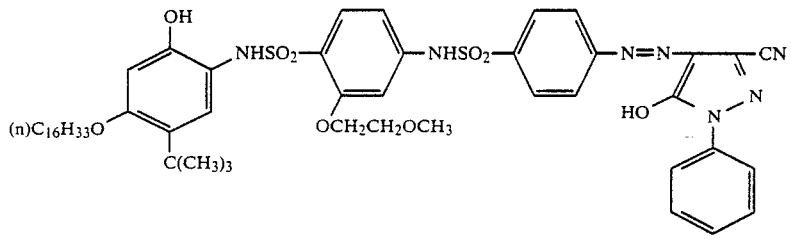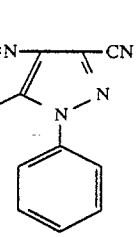

(11) Blue-sensitive emulsion layer containing a blue-sensitive internal latent image type direct positive emulsion of silver bromide (in an amount of 1.09 gm² as calculated in terms of amount of silver), 1.1 g/m² of gelatin, 0.04 mg/m² of a nucleating agent as used in layer (5), and 0.07 g/m² of sodium salt of 2-sulfo-5-n-pentadecylhydroquinone

(12) Ultraviolet-absorbing layer containing $4\times10^{-4}$ mol/m² of ultraviolet absorbents of the following chemical structure each and 0.30 g/m² of gelatin

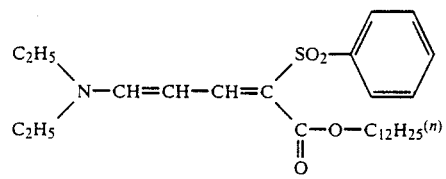

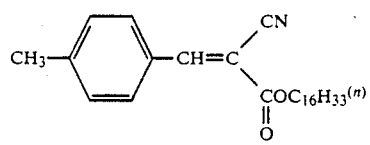

(13) Protective layer containing 0.10 g/m² of polymethyl methacrylate latex (mean grain size: 4 μm), 0.8 g/m² of gelatin, and 0.02 g/m² of triacryloyltriazine as a film hardener

Composition of Cover Sheet A

Cover Sheet A was prepared by coating the following layers (1') to (4') sequentially on a transparent polyethylene terephthalate support.

(1') Neutralizing layer containing 10 g/m² of an acrylic acid-butyl acrylate (weight ratio: 8:2) copoly- (4') 2 μm thick 1st timing layer containing a 6:4 (solids ratio) mixture of a 49.7:42.3:3:5 (weight) styrene-n-butyl acrylate-acrylic acid-N-methylolacrylamide copolymer latex and a 93:4:3 (weight) methyl methacrylate-acrylic acid-N-methylolacrylamide copolymer latex

| Composition of Processing Solution A | |
|---|---|
| 1-p-Tolyl-4-hydroxymethyl-4-methyl-3-pyrazolidone | 14 g |
| Methyl hydroquinone | 0.3 g |
| 5-Methylbenzotriazole | 3.5 g |
| Sodium sulfite (anhydrous) | 0.2 g |
| Sodium salt of carboxymethyl cellulose | 58 g |
| 28% Aqueous solution of potassium hydroxide | 200 cc |
| Benzyl alcohol | 1.5 cc |
| carbon black | 150 g |
| Water | 685 cc |

Light-sensitive sheets 19 to 25 thus prepared were exposed to light through a continuous wedge. These specimens were combined with processing solutions and cover sheets. These combinations were then passed through a pair of pressure rollers at temperatures of 15° C., 25° C. and 35° C. so that the processing solution was spread over the light-sensitive element. After 1 hour, these specimens were measured for density by means of a color densitometer. Thus, $D_{max}$ was obtained as in set forth in Table 2.

$D_{max}$ change was measured every 5 seconds after the spreading of the processing solution at a temperature of 25° C. The time required to reach half $D_{max}$ obtained 60 minutes after the spreading of the processing solution was determined. This value indicates the transfer speed. The higher the transfer speed is, the better is the properties of the light-sensitive material.

TABLE 2

| Light-sensitive sheet | Composition of Layer (6) and Layer (9) Coated amount per layer (g/m²) | | | $D_{max}^G$ | | | Transfer speed t ½ | Remarks |
|---|---|---|---|---|---|---|---|---|
| | Hydroquinone* (g/m²) | Coexisting compound | Gelatin (g/m²) | 15° C. | 25° C. | 35° C. | | |
| 19 | Hydroquinone A 0.66 | Polymer A 0.33 | 0.27 | 1.91 | 2.2 | 2.32 | 63 sec. | Comparative |
| 20 | Polymer 6 0.30 | — | 0.27 | 2.13 | 2.23 | 2.20 | 56 sec. | Present Invention |
| 21 | Polymer 12 | — | 0.27 | 2.19 | 2.25 | 2.23 | 55 sec. | Present |

TABLE 2-continued

| Light-sensitive sheet | Composition of Layer (6) and Layer (9) Coated amount per layer (g/m²) | | | $D_{max}{}^G$ | | | Transfer speed t ½ | Remarks |
|---|---|---|---|---|---|---|---|---|
| | Hydroquinone* (g/m²) | Coexisting compound | Gelatin (g/m²) | 15° C. | 25° C. | 35° C. | | |
| 22 | Polymer 101 0.33 | — | 0.27 | 2.13 | 2.25 | 2.27 | 56 sec. | Invention Present |
| 23 | Polymer 102 0.43 | — | 0.27 | 2.19 | 2.27 | 2.25 | 55 sec. | Invention Present |
| 24 | Polymer 203 0.37 | — | 0.27 | 2.13 | 2.23 | 2.20 | 56 sec. | Invention Present |
| 25 | Polymer 204 0.27 | — | 0.27 | 2.19 | 2.25 | 2.23 | 55 sec. | Invention Present Invention |

*The coated amount of hydroquinones is the same equivalent to redox.

Table 2 shows that the present light-sensitive sheets provide a higher transfer speed. The present light-sensitive sheets are also advantageous in that the temperature dependence of $D_{max}$ is small, providing excellent photographic images in a wide temperature range. Thus, it is made clear that the light-sensitive sheets comprising the present color stain inhibitors can exhibit excellent effects.

Any specimen can accomplish excellent color separation without color stain.

EXAMPLE 3

Light-sensitive sheets 26 to 32 comprising the compositions set forth in Table 3 were prepared in the same manner as in Example 2. Light-sensitive sheets 26 to 32 thus prepared were stored at room temperature over 0 hour (fresh), at a temperature of 60° C. under dry condition over 3 days, and at a temperature of 45° C. and a relative humidity of 80% over 3 days. These specimens were then exposed to light through a continuous wedge. These specimens were then combined with processing solutions and cover sheets. These combinations were passed through a pair of pressure rollers so that the processing solution was spread over the light-sensitive element. After 1 hour, these specimens were measured for density by means of a color densitometer. Thus, $D_{max}$ was determined as set forth in Table 3.

$D_{max}$ change was measured every 5 seconds after the spreading of the processing solution at a temperature of 25° C. The time required to reach half $D_{max}$ obtained 60 minutes after the spreading of the processing solution was determined. This value indicates the transfer speed.

The higher the transfer speed is, the better is the properties of the light-sensitive material.

TABLE 3

| Light-sensitive sheet | Composition of Layer (6) and Layer (9) Coated amount per layer (g/m²) | | | $D_{max}{}^G$ | | | Transfer speed t ½ | Remarks |
|---|---|---|---|---|---|---|---|---|
| | Hydroquinone* (g/m²) | Coexisting compound | Gelatin (g/m²) | Fresh | 60° C. dry-3 days | 45° C. 80% RH-3 days | | |
| 26 | Hydroquinone A 0.66 | Polymer A 0.33 | 0.27 | 2.30 | 1.83 | 1.65 | 63 sec. | Comparative |
| 27 | Polymer 303 0.36 | — | 0.27 | 2.08 | 1.81 | 1.79 | 56 sec. | Present Invention |
| 28 | Polymer 302 0.36 | — | 0.27 | 2.15 | 1.95 | 1.85 | 55 sec. | Present Invention |
| 29 | Polymer 305 0.36 | — | 0.27 | 2.29 | 2.16 | 1.97 | 54 sec. | Present Invention |
| 30 | Polymer 307 0.36 | — | 0.27 | 2.30 | 2.17 | 2.03 | 56 sec. | Present Invention |
| 31 | Polymer 308 0.25 | — | 0.27 | 2.29 | 1.95 | 1.89 | 48 sec. | Present Invention |
| 32 | Polymer 309 0.33 | — | 0.27 | 2.31 | 1.83 | 1.88 | 50 sec. | Present Invention |

*The coated amount of hydroquinones is the same equivalent to redox.

Table 3 shows that the present light-sensitive sheets provide a higher transfer speed. The present light-sensitive sheets are also advantageous in that the density change during preservation is improved. Thus, it is made clear that the light-sensitive sheets comprising the present color stain inhibitors can exhibit excellent effects.

Any specimen can accomplish excellent color separation without color stain.

While the invention has been described in detail and with reference to specific embodiments thereof, it will be apparent to one skilled in the art that various changes and modifications can be made therein without departing from the spirit and scope thereof.

What is claimed is:

1. A color diffusion transfer photographic light-sensitive material comprising at least a light-sensitive silver halide emulsion layer combined with a dye providing compound capable of releasing or producing a diffusible dye, an image-receiving layer capable of mordanting said diffusible dye and a neutralizing layer, said light-sensitive material further comprising at least one member selected from the group consisting of polymers obtained by the condensation of at least one of compounds represented by general formula (I) and at least one of compounds represented by general formula (III) in the presence of an acid catalyst; and polymers obtained by the condensation of at least one of compounds represented by general formula (I) and at least one of compounds represented by general formula (V) in the presence of an acid catalyst; with the proviso that said polymers obtained by condensation have an average molecular weight of from 1,000 to 24,500 when said polymers do not contain long-chain alkyl groups having 6 or more carbon atoms and said polymers have an average molecular weight of from 1,000 to 8,000 when said polymers contain long-chain alkyl groups having 6 or more carbon atoms:

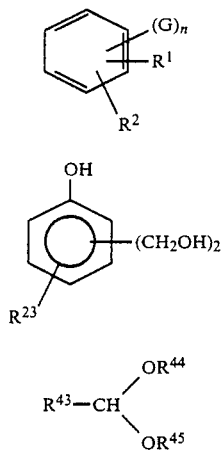

wherein G represents a hydroxyl group or a group which undergoes hydrolysis by an alkali to produce a hydroxyl group; n represents an integer 1 or more, with the proviso that the plurality of G's may be the same or different; $R^1$ and $R^2$ may be the same or different and each represents a hydrogen atom or a substituent on the benzene ring; $R^{23}$ represents a hydrogen atom, alkyl group, aryl group, aralkyl group, heterocyclic group, acyl group, carboxyl group or formyl group; $R^{43}$ represents a hydrogen atom, alkyl group, aryl group, aralkyl group, heterocyclic group, acyl group or carboxyl group; and $R^{44}$ and $R^{45}$ may be the same or different and each represents an alkyl group, with the proviso that $R^{44}$ and $R^{45}$ may be connected to each other to form a ring.

2. A color diffusion transfer photographic light-sensitive material as claimed in claim 1, wherein in the general formula (I) $R^1$ and $R^2$ may be the same or different and each represents a hydrogen atom, halogen atom, cyano group, sulfo group, carboxyl group, alkyl group, aryl group, aralkyl group, acyloxy group, acylamino group, amino group, sulfonamido group, alkoxy group, aryloxy group, alkylthio group, arylthio group, carbamoyl group, sulfamoyl group, alkoxycarbonyl group, aryloxycarbonyl group, alkylsulfonyl group, arylsulfonyl group, alkoxysulfonyl group, aryloxysulfonyl group, carbamoylamino group, sulfamoylamino group, carbamoyloxy group, alkoxycarbonylamino group, or aryloxycarbonylamino group, or when $R^1$ and $R^2$ are positioned adjacent to each other, they can be fused to form a carbon ring or a hetero ring.

3. A color diffusion transfer photographic light-sensitive material as claimed in claim 1, wherein in the general formula (I) G represents a hydroxyl group, and n represents an integer 2 or 3.

4. A color diffusion transfer photographic light-sensitive material as claimed in claim 1, wherein $R^{23}$ and $R^{43}$ each represents a $C_{1-18}$ substituted or unsubstituted alkyl group, $C_{7-25}$ substituted or unsubstituted aralkyl group, $C_{6-24}$ substituted or unsubstituted phenyl group, substituted or unsubstituted pyridine ring, or substituted or unsubstituted furan ring.

5. A color diffusion transfer photographic light-sensitive material as claimed in claim 1, wherein $R^{44}$ and $R^{45}$ each represents an alkyl group.

6. A color diffusion transfer photographic light-sensitive material as claimed in claim 1, wherein said compound of the general formula (I) is one represented by the formulae (VI), (VII), (VIII) or (IX):

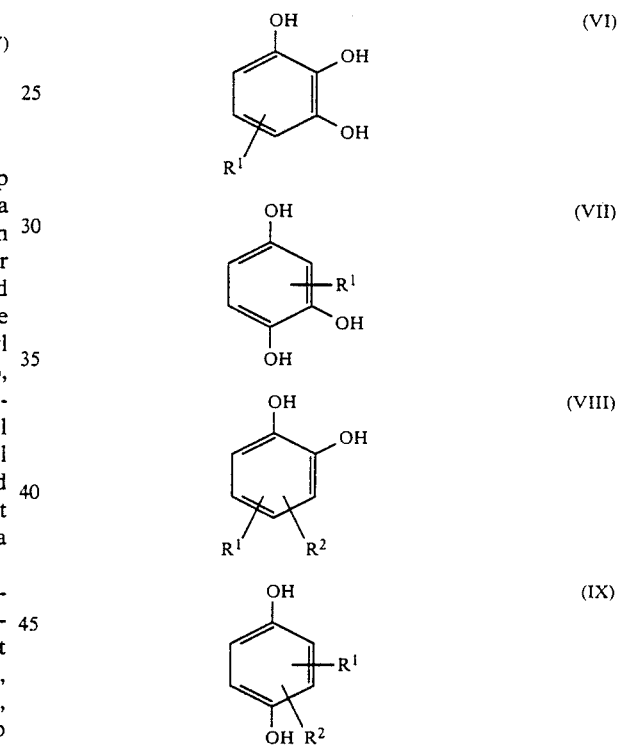

wherein $R^1$ and $R^2$ are as defined in claim 1.

7. A color diffusion transfer photographic light-sensitive material as claimed in claim 1, wherein at least one of said compounds is incorporated into an interlayer provided between emulsion layers having different color sensitivity from each other.

* * * * *